(12) United States Patent
Hayashi

(10) Patent No.: US 11,941,404 B2
(45) Date of Patent: Mar. 26, 2024

(54) PROCESSOR AND METHOD FOR CONTROLLING THE PROCESSOR

(71) Applicant: Panasonic Intellectual Property Management Co., Ltd., Osaka (JP)

(72) Inventor: Yoshiteru Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 328 days.

(21) Appl. No.: 17/375,574

(22) Filed: Jul. 14, 2021

(65) Prior Publication Data

US 2021/0342160 A1 Nov. 4, 2021

Related U.S. Application Data

(63) Continuation of application No. PCT/JP2019/045369, filed on Nov. 20, 2019.

(30) Foreign Application Priority Data

Mar. 4, 2019 (JP) ................................. 2019-039006

(51) Int. Cl.
*G06F 9/38* (2018.01)
*G06F 9/30* (2018.01)

(52) U.S. Cl.
CPC .......... *G06F 9/3887* (2013.01); *G06F 9/3001* (2013.01); *G06F 9/30032* (2013.01); *G06F 9/30109* (2013.01)

(58) Field of Classification Search
CPC ............... G06F 9/30109; G06F 9/3887; G06F 9/30032; G06F 9/30036; G06F 9/3001; G06F 9/30021

USPC .......................................................... 712/22
See application file for complete search history.

(56) References Cited

U.S. PATENT DOCUMENTS

| | | | | |
|---|---|---|---|---|
| 5,617,149 A | * | 4/1997 | Lee | G06V 20/40 348/700 |
| 6,115,073 A | * | 9/2000 | Horishi | H04N 9/64 348/E9.037 |
| 2002/0040427 A1 | | 4/2002 | Symes | |
| 2003/0061184 A1 | * | 3/2003 | Masgonty | G06N 3/045 706/15 |
| 2018/0129501 A1 | * | 5/2018 | Levison | G06F 9/3802 |

FOREIGN PATENT DOCUMENTS

| | | |
|---|---|---|
| JP | H03-105615 A | 5/1991 |
| JP | H04-76772 A | 3/1992 |
| JP | 2002-132497 A | 5/2002 |
| JP | 2015-191568 A | 11/2015 |

OTHER PUBLICATIONS

ISR for PCT/JP2019/045369, dated Feb. 25, 2020 (w/ translation).

* cited by examiner

*Primary Examiner* — Chun Kuan Lee
(74) *Attorney, Agent, or Firm* — Greenblum & Bernstein, P.L.C.

(57) ABSTRACT

A processor performs, in accordance with a single instruction, multiplication processing and comparison processing. The multiplication processing includes obtaining a multiplication result by multiplying together a first data element and a first value. The comparison processing includes comparing the multiplication result with a second data element. The first data element is stored in a first register, the second data element is stored in a second register, and the first value is stored in a third register.

19 Claims, 19 Drawing Sheets

Before Shift Processing

After Shift Processing

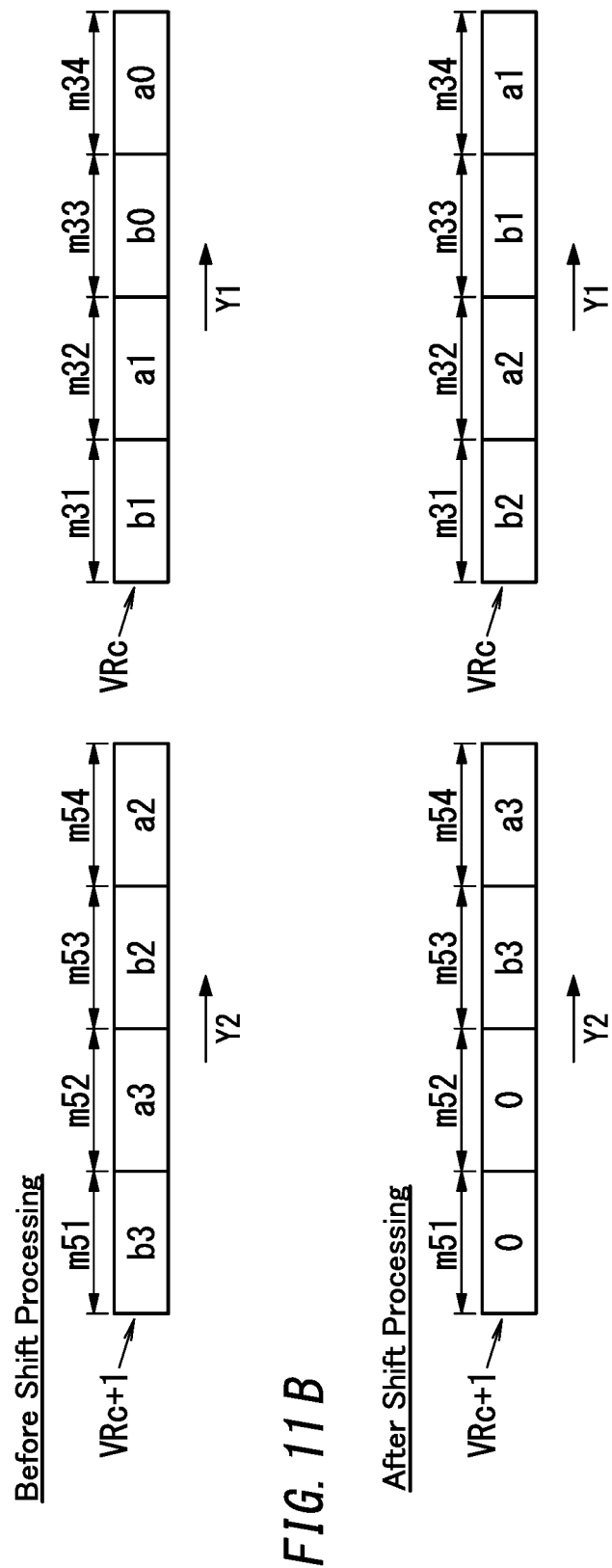

FIG. 19

| VRc+1 | VRc |
|---|---|
| b0 | a0 |

PROCESSOR AND METHOD FOR CONTROLLING THE PROCESSOR

CROSS-REFERENCE TO RELATED APPLICATIONS

The present application is a Bypass Continuation of International Application No. PCT/JP2019/045369 filed on Nov. 20, 2019, which is based upon, and claims the benefit of priority to, Japanese Patent Application No. 2019-039006, filed on Mar. 4, 2019. The entire contents of both applications are incorporated herein by reference.

TECHNICAL FIELD

The present disclosure generally relates to a processor and a method for controlling the processor, and more particularly relates to a processor with the ability to perform multiple types of processing in accordance with a single instruction and a method for controlling such a processor.

BACKGROUND ART

JP H03-105615 A discloses a composite processing circuit (processor) in which data stored in two registers are multiplied by a multiplier. Then, the composite processing circuit makes a comparator circuit compare the multiplication result obtained by the multiplier with another data stored in another register provided separately from the two registers and outputs, as a result of the comparison, a select signal, indicating which of the multiplication result obtained by the multiplier and another data should be selected, to a selector circuit. In accordance with the select signal, the selector circuit selectively outputs the larger one of the multiplication result obtained by the multiplier or another data.

In the composite processing circuit of JP H03-105615 A, the processing to be performed by the selector circuit is different from the processing of generating a histograms of oriented graphics (HOG) feature quantity. Thus, the composite processing circuit is unable to generate the HOG feature quantity. More specifically, the selector circuit selectively outputs the larger one of the multiplication result or another data which has been provided as the comparison result by the comparator circuit. To generate the HOG feature quantity, however, the selector circuit needs to perform the processing of determining, based on the comparison result provided by the comparator circuit, whether or not still another data, different from another data described above, should be output.

The present disclosure provides a processor with the ability to generate the HOG feature quantity more quickly and a method for controlling such a processor.

SUMMARY

A processor according to an aspect of the present disclosure performs, in accordance with a single instruction, multiplication processing and comparison processing. The multiplication processing includes obtaining a multiplication result by multiplying together a first data element and a first value. The comparison processing includes comparing the multiplication result with a second data element. The first data element is stored in a first register. The second data element is stored in a second register. The first value is stored in a third register.

A method for controlling a processor according to another aspect of the present disclosure includes performing, in accordance with a single instruction, multiplication processing and comparison processing. The multiplication processing includes obtaining a multiplication result by multiplying together a first data element and a first value. The comparison processing includes comparing the multiplication result with a second data element. The first data element is stored in a first register. The second data element is stored in a second register. The first value is stored in a third register.

BRIEF DESCRIPTION OF DRAWINGS

The figures depict one or more implementations in accordance with the present teaching, by way of example only, not by way of limitations. In the figures, like reference numerals refer to the same or similar elements.

FIG. 11A is a schematic representation showing a state of third and fifth vector registers yet to be subjected to shift processing according to a fourth variation;

FIG. 11B is a schematic representation showing a state of the third and fifth vector registers subjected to the shift processing;

FIG. 19 is a schematic representation showing an exemplary general-purpose register storing a boundary value inverse number and an exemplary general-purpose register storing a gradient class according to a ninth variation.

DESCRIPTION OF EMBODIMENTS

A processor according to an exemplary embodiment will now be described. Note that the embodiment to be described below is only an exemplary one of various embodiments of the present disclosure and should not be construed as limiting. Rather, the exemplary embodiment to be described below may be readily modified in various manners depending on a design choice or any other factor without departing from the scope of the present disclosure.

A processor 1 according to an exemplary embodiment will be described with reference to FIGS. 1-8. The processor 1 may be used, for example, in object detection processing of detecting a particular object (such as a human) from a given image, for example.

Note that the processor herein refers to a device including an instruction memory, a fetch unit, a decoder unit, a register file, a group of arithmetic units, and a data memory, all of which are integrated together on a single chip. Optionally, the instruction memory and the data memory may be provided outside of the chip.

In the object detection processing, a histogram is generated by extracting a plurality of feature quantities from a great many sample images shooting a particular object, and the features of the particular object are learned by a statistical learning technique, thereby acquiring a histogram representing the features of the particular object (as a reference histogram). Then, another histogram is generated by extracting a plurality of feature quantities from an input image and the histogram thus generated is compared with the reference histogram. If these two histograms turn out to be either similar to each other or matching each other as a result of the comparison, determination is made that the particular object should be shot in the input image.

As the feature quantity, a histograms of oriented gradients (HOG) feature quantity may be used.

Figure 1:
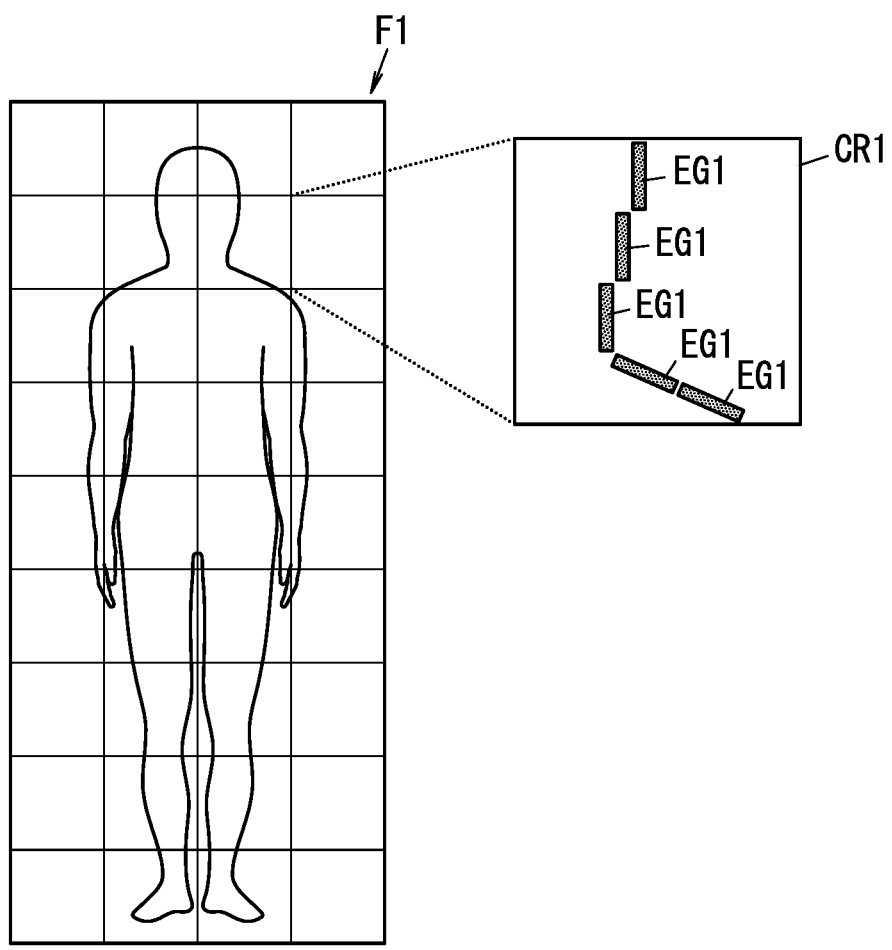
FIG. 1 illustrates a relationship between an input image and a certain region.
Figure 2:
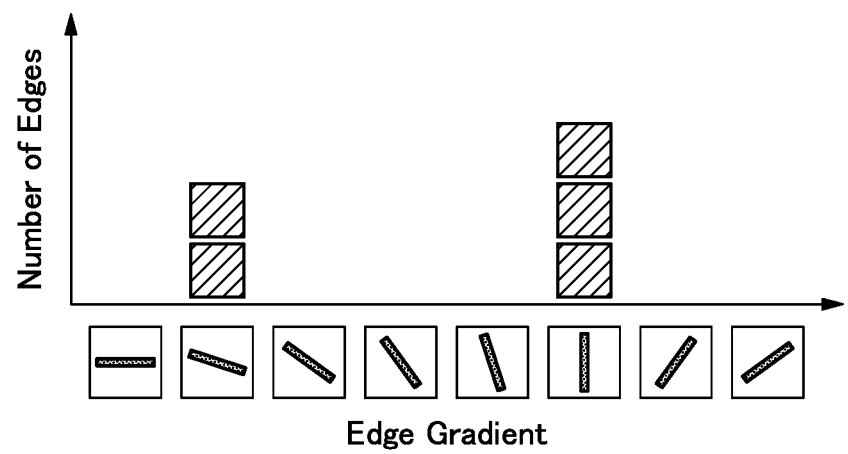
FIG. 2 illustrates what an HOG feature quantity is.

The HOG feature quantity is a feature quantity representing, as a histogram, the edge gradients of respective pixels in a certain region of a given image. Specifically, as shown in FIG. 1, the gradients of edges EG1 at respective pixels in a certain region CR1 of an input image F1 are obtained. Next, as shown in FIG. 2, the gradients of the edges EG1 thus obtained at the respective pixels are expressed as a histogram. This histogram represents an HOG feature quantity for the certain region CR1. Note that in the histogram shown in FIG. 2, the classes on the axis of abscissas represent the edge gradients and the frequencies of occurrence on the axis of ordinates represent the numbers of the edges. The classes on the axis of abscissas may be eight classes defined by equally dividing the range of 0 through 180 degrees into eight, for example.

The HOG feature quantity (histogram) thus obtained is compared with the reference histogram described above. If these two histograms turn out to be either similar to each other or matching each other as a result of the comparison, then determination is made that the particular object should be shot in the certain region CR1. On the other hand, if these two histograms turn out to be neither similar to each other nor matching each other, then determination is made that the particular object should not be shot in the certain region CR1.

Next, it will be described generally how to calculate the HOG feature quantity.

Figure 3:
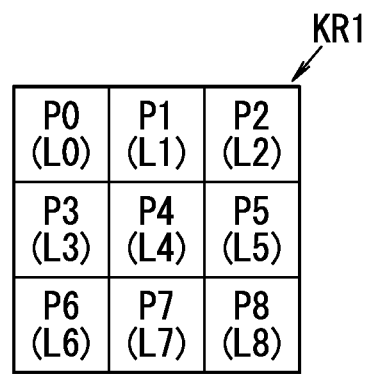
FIG. 3 illustrates how reference signs may be assigned to respective pixels of a 3×3 pixel matrix.

The gradient $\theta$ of an edge EG1 at each pixel may be calculated in the following manner. Take, for example, a pixel matrix KR1 of 3×3 pixels shown in FIG. 3. In FIG. 3, the reference signs P0-P9 are assigned to identify the pixels from each other, while the reference signs L0-L9 indicate the luminance values of the respective pixels P0-P9. Supposing the pixel P4 located at the center of the matrix is a pixel of interest, the gradient $\theta$ of the edge EG1 at the pixel of interest P4 is calculated. The gradient $\theta$ is represented by an angle of counterclockwise rotation around the axis of abscissas of the pixel matrix KR1 of 3×3 pixels. The luminance values of these pixels P0-P9 are designated by L0-L9, respectively. The angle $\theta$ may be expressed by using the difference (L1−L7) between the luminance values L1, L7 of the pixels P1, P7 respectively located over and under the pixel of interest P4 and the difference (L5−L3) between the luminance values L5, L3 of the pixels P5, P3 respectively located on the right and left of the pixel of interest P4. Note that in Equation (1), arctan indicates the inverse number of tan:

$$\theta = \arctan((L1-L7)/(L5-L3)) \quad (1)$$

Figure 4:
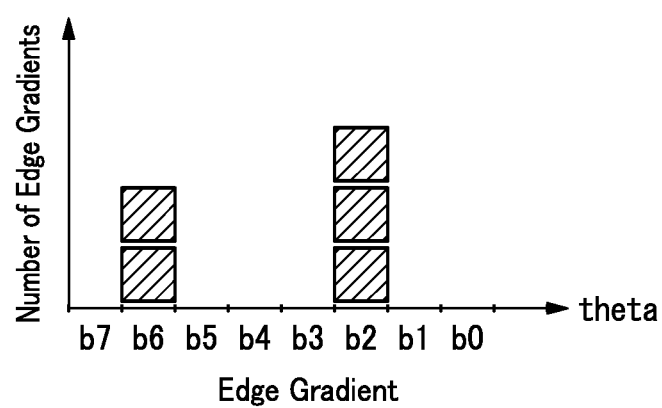
FIG. 4 illustrates what the class of a histogram (gradient class) is.

The classes theta of the histogram are classified into a plurality of (e.g., eight) gradient classes b0-b7 (see FIG. 4). Then, the angles $\theta$ are calculated at the respective pixels in the certain region CR1 of the image F1, determination is made which of the eight gradient classes b0-b7 each of the angles $\theta$ thus calculated belongs to, and the frequency of occurrence of the gradient class b0-b7 thus determined is incremented by one. The gradient classes b0-b7 are defined by equally dividing the range from 0 to 180 degrees into eight, for example. The gradient classes b0-b7 are arranged from 180 degrees toward $\theta$ degrees in the order of b0, b1, and b7. In the following description, the difference (L1−L7) will be hereinafter referred to as an "upper-lower difference L17" and the difference (L5−L3) will be hereinafter referred to as a "right-left difference L53."

Next, a method for simplifying the calculation of the gradient $\theta$ will be described.

The quotient ((L1−L7)/(L5−L3)) obtained by Equation (1) will be hereinafter designated by "angle." That is to say, angle is defined by the following Equation (2):

$$\text{angle} = ((L1-L7)/(L5-L3)) \quad (2)$$

Figure 5:
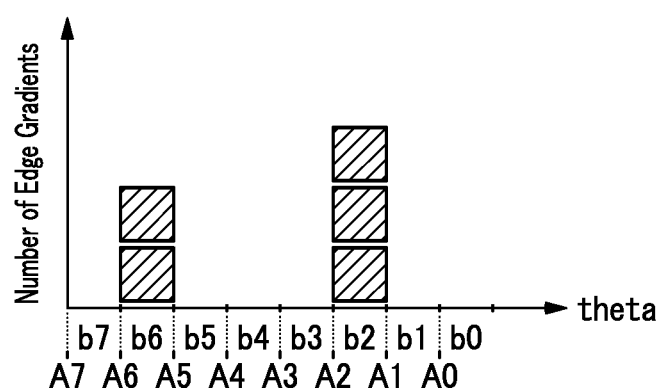
FIG. 5 illustrates boundary values of the class of a histogram.

Calculation of arctan by Equation (1) is complicated and therefore may be omitted. Instead, only angle may be calculated by Equation (2). Then, determination is made which of the eight gradient classes b0-b7 of the histogram the angle value belongs to. Specifically, boundary values A0-A7 for the eight gradient classes b0-b7 of the histogram may be set in advance as shown in FIG. 5. Next, the angle value is calculated first by Equation (2) with respect to the pixel matrix KR1 of 3×3 pixels of interest.

TABLE 1

| if | (angle>A0 {theta=b0;}) |
|---|---|
| else if | (angle>A1 {theta=b1;}) |
| else if | (angle>A2 {theta=b2;}) |
| : | |
| : | |
| else if | (angle>A7 {theta=b7;}) |

Then, as shown in Table 1, the plurality of boundary values A0-A7 are sequentially compared in the descending order (i.e., the largest boundary value A0 first) with the angle value. Note that the plurality of boundary values A0-A7 are associated one to one with the plurality of gradient classes b0-b7. Specifically, first, determination is made whether or not the if clause (angle>A0) on the first line of Table 1 is satisfied. This determination will be hereinafter referred to as a "boundary value decision." If the answer is YES, then determination is made that the angle θ calculated by Equation (1) based on this angle value should belong to the gradient class b0 associated with the boundary value A0. On the other hand, if the answer is NO, then the boundary value decision is made whether or not the else if clause (angle>A1) on the second line of Table 1 is satisfied. If the answer is YES, then determination is made that the angle θ calculated by Equation (1) based on this angle value should belong to the gradient class b1 associated with the boundary value A1. After that, the boundary value decision will be made repeatedly and sequentially with respect to the other boundary values A2-A7. This processing allows determination to be made, even without the calculation of arctan, which of the eight gradient classes b0-b7 the angle θ belongs to.

Next, a method for further simplifying the calculation of the gradient θ will be described.

TABLE 2

| if | $((1/A0 \times (L1 - L7)) > (L5 - L3)$ {theta=b0:}) |
|---|---|
| else if | $((1/A1 \times (L1 - L7)) > (L5 - L3)$ {theta=b1:}) |
| else if | $((1/A2 \times (L1 - L7)) > (L5 - L3)$ {theta=b2:}) |
| ⋮ | |
| else if | $((1/A7 \times (L1 - L7)) > (L5 - L3)$ {theta=b7:}) |

It takes some time to calculate angle by Equation (2) because the calculation involves division. Thus, the if clause (angle>A0) on the first line of Table 1 is modified into a form that involves no division such as the if clause (1/A0×(L1−L7)>(L5−L3)) on the first line of Table 2. Then, the boundary value decision is made. In the same way, the else if clause on the second line and on of Table 1 is also modified into the form of the else if clause on the second line and on of Table 2 to make the boundary value decision. Note that 1/A0, 1/A1, ... and 1/A7 in Table 2 are given as known numbers. In the following description, the inverse numbers 1/A0 to 1/A7 of boundary values will also be hereinafter referred to as "boundary value inverse numbers a0-a7."

Note that in Table 2, the boundary value inverse number a0 (=1/A0) and the gradient class b0 in the if clause on the first line form a set. In the following description, this set will be hereinafter referred to as a set (a0, b0). Likewise, the other sets, each including a boundary value inverse number and a gradient class, in the else if clauses on the second line and on will also be hereinafter referred to as set (a1, b1), ... and set (a7, b7), respectively.

Next, a configuration for the processor 1 will be described in detail.

The processor 1 is a processor for generating an HOG feature quantity by making the boundary value decisions on respective lines of Table 2. That is to say, the processor 1 determines which of the gradient classes b0-b7 the gradient θ at the pixel of interest P4 belongs to, while exchanging the sets, each including a boundary value inverse number a0-a7 and a gradient class b0-b7, sequentially from the set (a0, b0) through the set (a7, b7), with respect to the upper-lower difference L17 and the right-left difference L53. In that case, the processor 1 makes the boundary value decision on each line of Table 2 in accordance with a single vector instruction. Then, the processor 1 makes the boundary value decisions on the respective lines of Table 2 on every pixel (pixel of interest) in the certain region CR1. In this manner, an HOG feature quantity is generated with respect to the certain region CR1.

Figure 6:
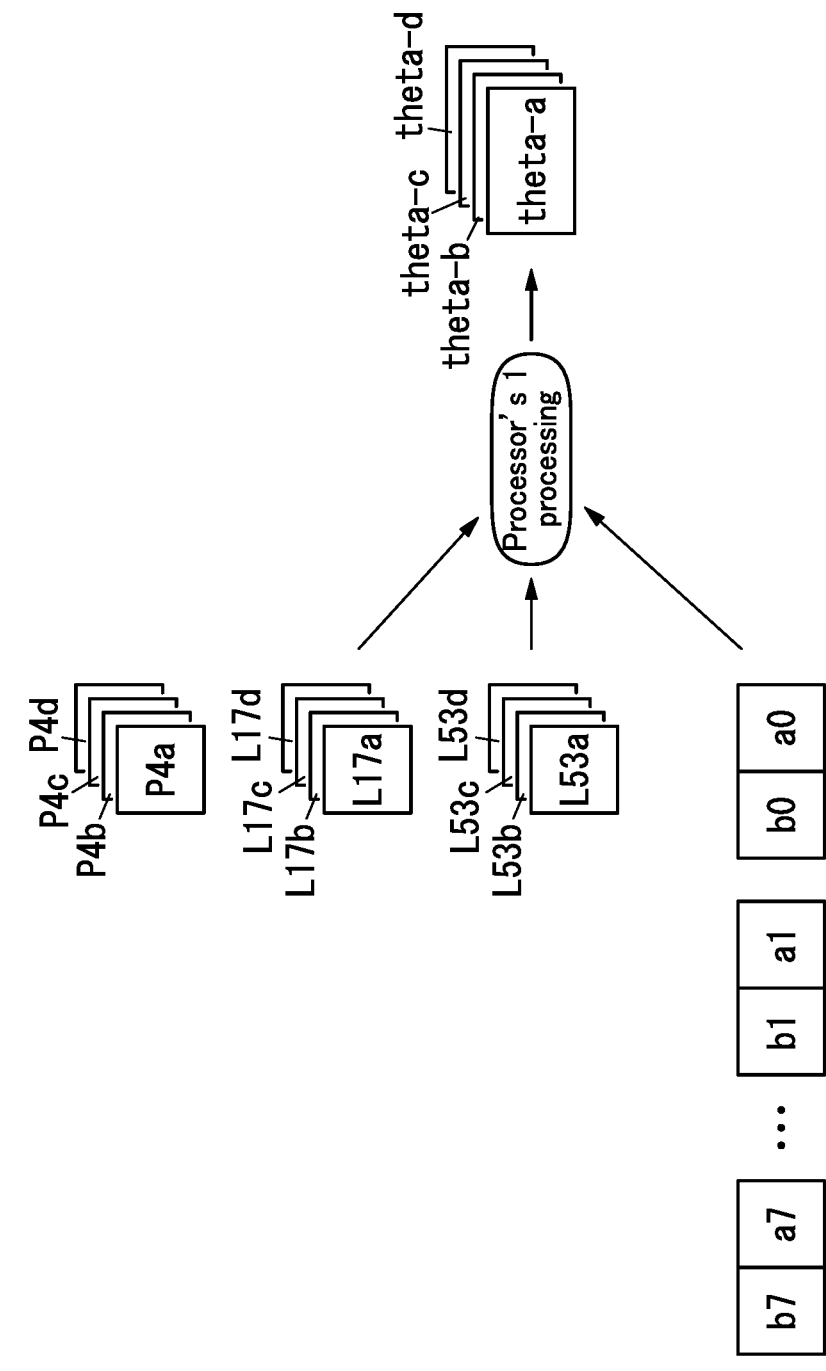
FIG. 6 illustrates how to calculate gradients at a plurality of pixels of interest by parallel processing.

More specifically, the processor 1 makes the boundary value decisions on the respective lines of Table 2 on a plurality of (e.g., four in this example) pixels of interest P4a-P4d as parallel processing as shown in FIG. 6. Specifically, the processor 1 determines which of the gradient classes theta-a-theta-d the gradient θ at each of the pixels of interest P4a-P4d belongs to, while exchanging the sets, each including a boundary value inverse number a0-a7 and a gradient class b0-b7, sequentially from the set (a0, b0) through the set (a7, b7), with respect to the upper-lower differences L17a, L17b, L17c, L17d and the right-left differences L53a, L53b, L53c, L53d of the plurality of pixels of interest P4a-P4d. In that case, the processor 1 makes, in accordance with a single vector instruction, the boundary value decisions on the same line of Table 2 with respect to the respective pixels of interest P4a-P4d. Then, the processor 1 makes the boundary value decisions on the respective lines of Table 2 on every pixel (pixel of interest) in the certain region CR1. In this manner, an HOG feature quantity is generated with respect to the certain region CR1.

Note that each of the upper-lower differences L17a, L17b, L17c, L17d shown in FIG. 6 is the difference between the pixel values of two pixels located over and under an associated one of the pixels of interest P4a-P4d and that each of the right-left differences L53a, L53b, L53c, L53d shown in FIG. 6 is the difference between the pixel values of two pixels located on the right and left of an associated one of the pixels of interest P4a-P4d.

Figure 7:
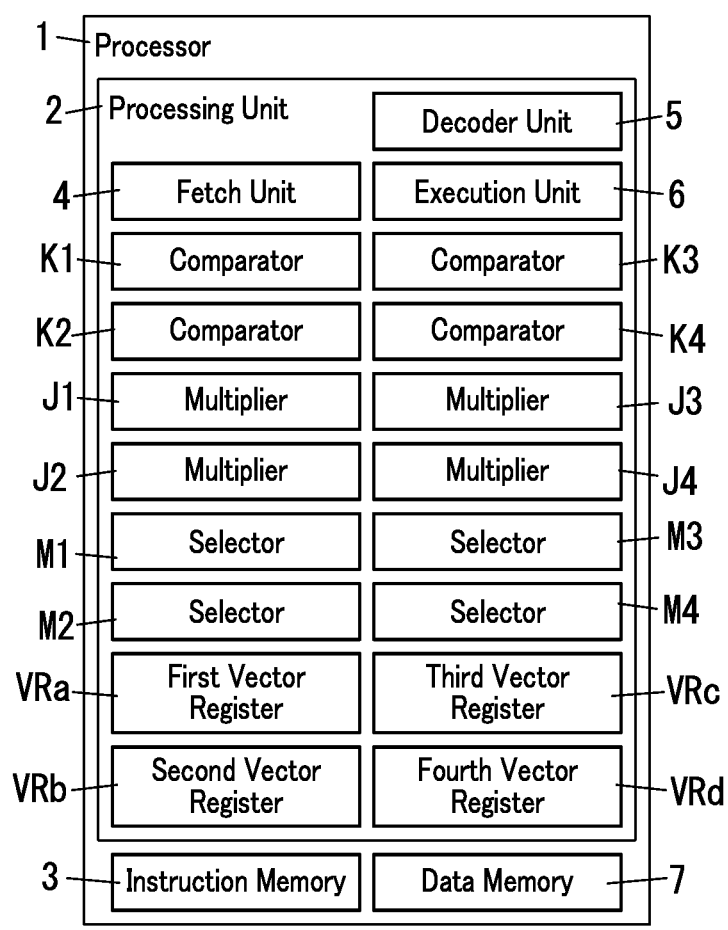
FIG. 7 is a configuration diagram illustrating an exemplary configuration for a processor according to an embodiment.

As shown in FIG. 7, the processor 1 includes a processing unit 2, an instruction memory 3, and a data memory 7. The processing unit 2 includes a first vector register VRa (first register), a second vector register VRb (second register), a third vector register VRc (third register), a fourth vector register VRd (fourth register), a plurality of (e.g., four in this example) multipliers J1-J4, a plurality of comparators K1-K4, selectors M1-M4, a fetch unit 4, a decoder unit 5, and an execution unit 6.

The first to fourth vector registers VRa-VRd may have a storage capacity of 128 bits, for example. The first vector register VRa, the second vector register VRb, and the third vector register VRc are included in the processor 1 in this embodiment but do not have to be included in the processor 1. Likewise, the instruction memory 3 and the data memory 7 do not have to be included in the processor 1, either. Optionally, the processing unit 2 may include additional registers (such as a vector register and a general-purpose register) other than the first to third vector registers VRa-VRc and additional arithmetic units other than the execution unit 6, the comparators K1-K4, and the selectors M1-M4.

Figure 8:
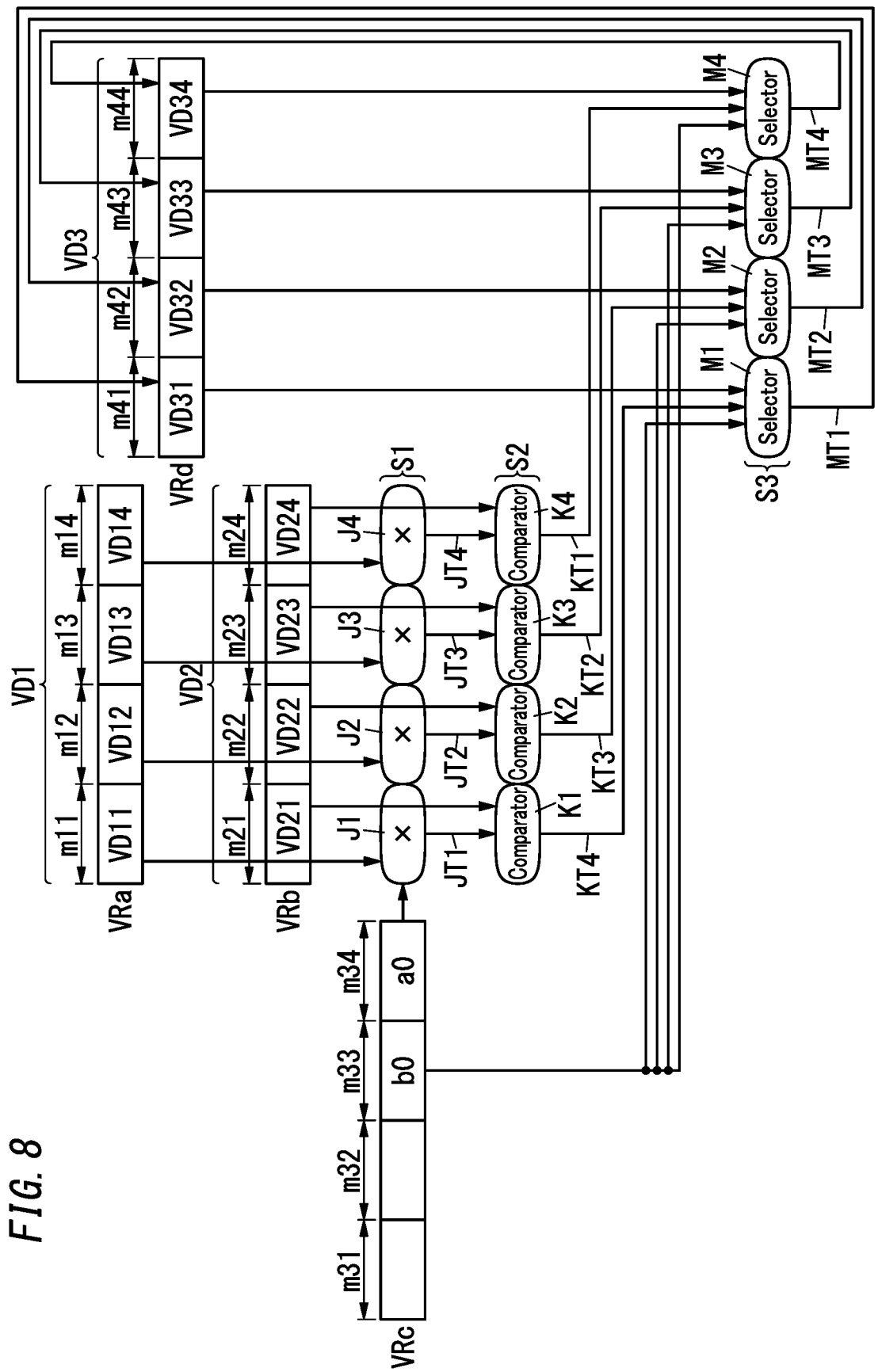
FIG. 8 is a schematic representation illustrating the flow of processing to be performed by the processor.

As shown in FIG. 8, the first vector register VRa stores first vector data VD1. The first vector data VD1 is made up of a plurality of (e.g., four in this example) first data elements VD11-VD14. Each of the first data elements VD11-VD14 is data representing the difference between the luminance values of pixels located over and under an associated one of the pixels of interest P4a-P4d (hereinafter referred to as "upper-lower differential data"). The first vector register VRa has a plurality of (e.g., four in this example) storage areas m11-m14. The number and storage capacity of the storage areas m11-m14 may be set freely as long as the multiplication result of the number of the storage areas and the storage capacity of the storage areas is equal to 128 bits which is the storage capacity of the vector register. Thus, the number of the storage areas m11-m14 is four in this embodiment but does not have to be four. The plurality of first data elements VD11-VD14 are associated one to one with the plurality of storage areas m11-m14 and are stored in their associated storage areas m11-m14. Each of the storage areas m11-m14 may have a storage capacity of 32 bits, for example, and each of the first data elements VD11-VD14 may be 32-bit data, for example. Note that it is a general practice to set the storage capacity of the storage areas and the size of the data elements at the same value. Therefore, if the first data elements are 8-bit data, then the storage areas suitably have a storage capacity of 8 bits. If the first data elements are 8-bit data, then the number of the first data elements varies according to the size of each first data element and the number of the first data elements is sixteen. The same statement applies to the second and third data elements as well. The number of the first to third data elements to calculate in parallel and the numbers of the comparators, multipliers, and selectors for the processor need to be varied according to the number of the first to third data elements. In this case, the numbers are both sixteen. In the following description, the first data elements VD11-VD14 will also be hereinafter referred to as upper-lower differential data VD11-VD14.

As shown in FIG. 8, the second vector register VRb stores second vector data VD2. The second vector data VD2 is made up of a plurality of (e.g., four in this example) second data elements VD21-VD24. Each of the second data elements VD21-VD24 is data representing the difference between the luminance values of pixels located on the right and left of an associated one of the pixels of interest P4a-P4d (hereinafter referred to as "right-left differential data"). In the following description, the second data elements VD21-VD24 will also be hereinafter referred to as right-left differential data VD21-VD24. The second data elements VD21-VD24 are data correlated to the first data elements VD11-VD14.

The second vector register VRb has a plurality of storage areas m21-m24. The plurality of second data elements VD21-VD24 are associated one to one with the plurality of storage areas m21-m24 and are stored in their associated storage areas m21-m24. Each of the storage areas m21-m24 may have a storage capacity of 32 bits, for example, and each of the second data elements VD21-VD24 may be 8-bit data, for example.

As shown in FIG. 8, the third vector register VRc stores a boundary value inverse number a0 (first value) and a gradient class b0 (second value). The third vector register VRc has a plurality of (e.g., four in this example) storage areas m31-m34. The boundary value inverse number a0 is stored in the storage area m34 and the gradient class b0 is stored in the storage area m33. In this embodiment, the storage areas m31, m32 of the third vector register VRc are not used. Each of the storage areas m31-m34 may have a storage capacity of 32 bits, for example. The boundary value inverse number a0 and the gradient class b0 are 8-bit data, for example. Note that the boundary value inverse number a0 and the gradient class b0 may be stored in any predetermined places in the third vector register VRc. For example, the boundary value inverse number a0 and the gradient class b0 may be stored in the storage areas m31, m32, respectively. In that case, when the boundary value inverse number a0 and the gradient class b0 are used in the processing to be described later, the boundary value inverse number a0 and the gradient class b0 will be retrieved from those predetermined places. The fourth vector register VRd stores third vector data VD3 as shown in FIG. 8. The third vector data VD3 is made up of a plurality of (e.g., four in this example) third data elements VD31-VD34. The fourth vector register VRd has a plurality of (e.g., four in this example) storage areas m41-m44. Each of the storage areas m41-m44 may have a storage capacity of 32 bits, for example. The plurality of third data elements VD31-VD34 are associated one to one with the plurality of storage areas m41-m44 and are stored in their associated storage areas m41-m44.

The plurality of storage areas m41-m44 are associated one to one with the plurality of selectors M1-M4 as will be described later. In each of the storage areas m41-m44, stored is the selection result provided from an associated one of the selectors M1-M4. Each of the third data elements VD31-V34 is constituted by the selection result stored in an associated one of the storage areas m41-m44.

The plurality of storage areas m11-m14, the plurality of storage areas m21-m24, the plurality of storage areas m31-m34, the plurality of multipliers J1-J4 to be described later, the plurality of comparators K1-K4 to be described later, and the plurality of selectors M1-M4 to be described later are associated one to one with each other. Also, the plurality of first data elements VD11-VD14, the plurality of second data elements VD21-VD24, and the plurality of third data elements VD31-VD34 are also associated one to one with each other. The plurality of first data elements VD11-VD14, the plurality of second data elements VD21-VD24, and the plurality of third data elements VD31-VD34 that are associated one to one with each other are stored in their associated with storage areas in the three vector registers VRa, VRb, VRd.

The instruction memory 3 is a volatile memory that stores an instruction to be executed by the processor 1. The fetch unit 4 is a block for fetching the instruction to execute from the instruction memory 3. The decoder unit 5 is a block for decoding the instruction fetched by the fetch unit 4. The execution unit 6 is a block for executing the instruction decoded by the decoder unit 5. The data memory 7 is a memory for saving data to be processed in accordance with the instruction fetched from the instruction memory 3.

The instruction to be executed by the execution unit 6 includes a vector instruction to perform multiplication processing S1, comparison processing S2, and replacement processing S3 in accordance with a single instruction as shown in FIG. 8. The multiplication processing S1, the comparison processing S2, and the replacement processing S3 are performed in this order.

The multiplication processing S1 is the processing of obtaining multiplication results JT1-JT4 by multiplying together the first data elements VD11-VD14 stored in the first vector register VRa and the boundary value inverse number a0 stored in the third vector register VRc. The comparison processing S2 is the processing including comparing the multiplication results JT1-JT4 with the second data elements VD21-VD24 stored in the second vector register VRb. The replacement processing S3 is the processing of replacing, based on the comparison result of the comparison processing S2, the third data elements VD31-VD34 stored in the fourth vector register VRd with the gradient class b0 stored in the third vector register VRc.

More specifically, the multiplication processing S1 includes generating a plurality of multiplication results JT1-JT4 by multiplying together each of the plurality of first data elements VD11-VD14 stored in the first vector register VRa and the boundary value inverse number a0 stored in the third vector register VRc. Note that the plurality of multiplication results JT1-JT4 are associated one to one with the plurality of second data elements VD21-VD24. The comparison processing S2 includes generating a plurality of comparison results KT1-KT4 by comparing each of the plurality of second data elements VD21-VD24 stored in the second vector register VRb with an associated one of the plurality of multiplication results JT1-JT4. The plurality of comparison results KT1-KT4 are associated one to one with the plurality of third data elements VD31-VD34. The replacement processing S3 includes replacing, based on an associated one of the plurality of comparison results KT1-KT4, each of the plurality of third data elements VD31-VD34 stored in the fourth vector register VRd with the gradient class b0 stored in the third vector register VRc.

The execution unit 6 performs the multiplication processing S1, the comparison processing S2, and the replacement processing S3 in accordance with the vector instruction described above.

When performing the multiplication processing S1, the execution unit 6 reads the first data elements VD11-VD14 from the storage areas m11-m14 in the first vector register VRa and provides each of the first data elements VD11-VD14 thus read to an associated one of the multipliers J1‑J4 as shown in FIG. 8. In addition, the execution unit 6 also reads the boundary value inverse number a0 from the storage area m34 in the third vector register VRc and provides the boundary value inverse number a0 thus read to each of the multipliers J1‑J4.

Based on these input values, the multipliers J1‑J4 multiply together the first data elements VD11-VD14 and the boundary value inverse number a0 to generate multiplication results JT1-JT4, respectively. The multipliers J1‑J4 output each of the multiplication results JT1-JT4 thus generated to an associated one of the comparators K1-K4. Note that the plurality of multiplication results JT1-JT4 are associated one to one with the plurality of comparators K1-K4.

When performing the comparison processing S2, the execution unit 6 reads the second data elements VD21-VD24 from the storage areas m21-m24 in the second vector register VRb and provides each of the second data elements VD21-VD24 thus read to an associated one of the comparators K1-K4 as shown in FIG. 8. In addition, each of the comparators K1-K4 also receives the multiplication result JT1-JT4 calculated by an associated one of the multipliers J1-J4.

Based on these input values, the comparators K1-K4 compare the multiplication results JT1-JT4 thus received with the second data elements VD21-VD24, respectively, and output the comparison results KT1-KT4 thus obtained to their associated selectors M1-M4.

When performing the replacement processing S3, the execution unit 6 reads the gradient class b0 from the storage area m33 in the third vector register VRc and provides the gradient class b0 thus read to each of the selectors M1-M4 as shown in FIG. 8. In addition, the execution unit 6 also reads the third data elements VD31-VD34 from the storage areas m41-m44 in the fourth vector register VRd and provides each of the third data elements VD31-VD34 thus read to an associated one of the selectors M1-M4. In addition, each of the selectors M1-M4 also receives the comparison result KT1-KT4 obtained by an associated one of the comparators K1-K4.

Based on these input values, the selectors M1-M4 each replace, based on an associated one of the comparison results KT1-KT4, an associated one of the third data elements VD31-VD34 in the storage areas m41-m44 in the fourth vector register VRd with the gradient class b0 received.

More specifically, each of the selectors M1-M4 selects the gradient class b0 from the gradient class b0 and an associated one of the third data elements VD31-VD34 that have been provided if the comparison result KT1-KT4 provided indicates that an associated one of the multiplication results JT1-JT4 is greater than an associated one of the second data elements VD21-VD24 (i.e., if the answer to the if clause on the first line of Table 2 is YES). In that case, the selector M1-M4 overwrites, as the selection result MT1-MT4, the gradient class b0 selected in an associated one of the storage areas m41-m44 in the fourth vector register VRd. That is to say, the selector M1-M4 replaces one of the third data elements VD31-VD34 which is associated with the comparison result KT1-KT4 in the fourth vector register VRd with the gradient class b0 provided. As a result, the third data elements VD31-VD34 in the fourth vector register VRd are updated into the gradient class b0 based on the comparison results KT1-KT4.

On the other hand, each of the selectors M1-M4 selects an associated one of the third data elements VD31-VD34 from the gradient class b0 and the third data element VD31-VD34 provided if the comparison result KT1-KT4 provided indicates that an associated one of the multiplication results JT1-JT4 is equal to or less than an associated one of the second data elements VD21-VD24 (i.e., if the answer to the if clause on the first line of Table 2 is NO). In that case, the selector M1-M4 overwrites the third data element VD31-VD34 selected in an associated one of the storage areas m41-m44 in the fourth vector register VRd. That is to say, the selector M1-M4 replaces one of the third data elements VD31-VD34 which is associated with the comparison result KT1-KT4 in the fourth vector register VRd with the third data element VD31-VD34 provided. That is to say, the third data elements VD31-VD34 in the fourth vector register VRd are not updated but maintained.

As can be seen from the foregoing description, the boundary value decision expressed by the if clause on the first line of Table 2 is made with respect to the four pixels of interest P4a-P4d by executing the vector instruction described above. Then, the determination is made that any pixel of interest that satisfies the condition expressed by the if clause among the four pixels of interest P4a-P4d should have a gradient θ belonging to the gradient class b0. In that case, the decision is stored as the third data element VD31-VD34 in an associated one of the storage areas m41-m44 in the fourth vector register VRd.

After that, the vector instruction described above will be executed repeatedly with the set including the boundary value inverse number a0 and the gradient class b0 that are stored in the third vector register VRc exchanged sequentially from the next set (a1, b1) through the last set (a7, b7). In this manner, the boundary value decisions expressed by the else if clauses on the second line and on of Table 2 are made with respect to the four pixels of interest P4a-P4d. Then, the decision (indicating which of the gradient classes b0-b7 the gradient belong to) is stored as the third data element VD31-VD34 in an associated one of the storage areas m41-m44 in the fourth vector register VRd. Subsequently, the boundary value decisions on the respective lines of Table 2 will be made on every pixel (i.e., every pixel of interest) in the certain region CR1, thereby generating an HOG feature quantity with respect to the certain region CR1.

TABLE 3

| | |
|---|---|
| Mnemonic | pgrad.[D] VRd, VRa, VRb, VRc |
| Data Types | u8, s8, u16, s16, u32, s32, u64, s64, f16, f32, f64 |
| Read/Write | read: VRa, VRb, VRc, VRd, write: VRd |
| Operation | If [D] is u8:<br>VRd[7:0]←(umul(VRa[7:0], VRc[7:0])>VRb[7:0]) ? VRc[15:8] : VRd[7:0]<br>VRd[15:8]←(umul(VRa[15:8], VRc[7:0])>VRb[15:8]) ? VRc[15:8] : VRd[15:8]<br>⋮<br>VRd[15:8]←(umul(VRa[15:8], VRc[7:0])>VRb[15:8]) ? VRc[15:8] : VRd[15:8]<br>If [D] is s8:<br>VRd[7:0]←(smul(VRa[7:0], VRc[7:0])>VRb[7:0]) ? VRc[15:8] : VRd[7:0]<br>VRd[15:8]←(smul(VRa[15:8], VRc[7:0])>VRb[15:8]) ? VRc[15:8] : VRd[15:8]<br>⋮<br>VRd[127:120]←(smul(VRa[127:120], VRc[7:0])>VRb[127:120]) ? VRc[15:8] : VRd[127:120]<br>If [D] is u16:<br>VRd[15:0]←(umul(VRa[15:0], VRc[15:0])>VRb[15:0]) ? VRc[31:16] : VRd[15:0]<br>VRd[31:16]←(umul(VRa[31:16], VRc[15:0])>VRb[31:16])? VRc[31:16] : VRd[31:16]<br>⋮<br>VRd[127:112]←(umul(VRa[127:112], VRc[15:0])>VRb[127:112]) ? VRc[31:16] : VRd[127:112]<br>Meanings of signs:<br>umul(X,M)   Unsigned multiplication X, Y<br>smul(X,M)   signed multiplication X, Y |

Table 3 shows exemplary "Mnemonic," "Data Types," "Read/Write," and "Operation" in a situation where the vector instruction described above is loaded into the processor 1.

In the "Mnemonic" column of Table 3, [D] of pgrad. [D] is to be filled in with a sign representing the data type of any of the first data elements VD11-VD14, the second data elements VD21-VD24, and the third data elements VD31-VD34. The signs "VRa," "VRb," "VRc," and "VRd" in the "Mnemonic" column of Table 3 specify the vector registers to use. Specifically, "VRa" denotes the first vector register VRa, "VRb" denotes the second vector register VRb, "VRc" denotes the third vector register VRc, and "VRd" denotes the fourth vector register VRd. In "VRd," stored are binary data elements (i.e., the third data elements VD31-VD34). In this embodiment, these data elements have the same bit width as the data elements stored in VRa, VRb, and VRc (specifically, the first data elements VD11-VD14, the second data elements VD21-VD24, the boundary value inverse number a0, and the gradient class).

In the "Data Types" column of Table 3, "u8" denotes 8 bits of either an unsigned integer or a fixed-point number, "s8" denotes 8 bits of either a signed integer or fixed-point number, "f16" denotes 16 bits of a half-precision floating-point number, "f32" denotes 32 bits of a single-precision floating-point number, and "f64" denotes 64 bits of a double precision floating-point number. The "Read/Write" column of Table 3 indicates whether each of VRa-VRd is used for reading or writing.

The "Operation" column of Table 3 indicates the processing (i.e., the multiplication processing S1, the comparison processing S2, and the replacement processing S3) to be performed in accordance with the vector instruction. In the "Operation" column, [7:0] of VRc[7:0], for example, denotes data, of which the bit locations are from 0 through 7. Note that a part such as "VRa[7:0], VRc[7:0]" represents the multiplication processing S1, a part such as "umul(VRa [7:0], VRc[7:0])>VRb[7:0]" represents the comparison processing S2, and a part such as "VRd[7:0]←( . . . )? VRc[15:8]: VRd[7:0]" indicates that VRc[15:8] is entered into VRd[7:0] if the inequality in ( . . . ) is satisfied and that VRd[7:0] is entered into VRd[7:0] unless the inequality in ( . . . ) is satisfied and represents the replacement processing S3. In the "Operation" column of Table 3, the operation to be performed when [D] is u8, the operation to be performed when [D] is s8, and the operation to be performed when [D] is u16 are described as examples.

In the embodiment described above, the vector registers VRa-VRd are implemented as 128-bit vector registers. However, the bit width of the vector registers VRa-VRd does not have to be 128 bits but may also be 64 bits, 256 bits, 512 bits, or 1024 bits, for example. As the bit width of the vector registers VRa-VRd varies, the number of the data elements stored there also changes. Nevertheless, the operations to be performed remains essentially the same.

Next, the time it takes to have the three types of processing S1-S3 done according to this embodiment and the time it takes to do the same according to a comparative example will be described in comparison. According to this embodiment, the three types of processing S1-S3 are performed in accordance with a single vector instruction as described above. Meanwhile, according to the comparative example, the three types of processing S1-S3 are performed in accordance with three different vector instructions, respectively. Even though it usually takes less than one clock cycle (e.g., 0.1 clock cycles) to have each type of processing S1-S3 done, it takes at least one clock cycle to execute one vector instruction. In this embodiment, the three types of processing S1-S3 are performed sequentially in accordance with a single vector instruction, and therefore, the three types of processing S1-S3 themselves are finished when 0.3 clock cycles (=3×0.1 clock cycle) passes since a point in time when a vector instruction is issued. This duration of 0.3 clock cycles is within one clock cycle that it takes to execute the single vector instruction. Therefore, it takes one clock cycle to execute a vector instruction that requires the three types of processing S1-S3 to be performed. Meanwhile, according to the comparative example, a first vector instruction is issued to have the first processing S1 performed, a second vector instruction is issued in the next clock cycle to have the second processing S2 performed, and a third vector instruction is issued in the following clock cycle to have the third processing S3 performed. Thus, according to the comparative example, it takes three clock cycles (=1 clock cycle+1 clock cycle +1 clock cycle) to finish the third processing S3 since the first vector instruction has been issued. Thus, having the three types of processing S1-S3 performed in accordance with a single vector instruction as in this embodiment allows the series of three types of processing S1-S3 to be performed more quickly. This enables the processing of generating an HOG feature quantity to be done more quickly.

As can be seen from the foregoing description, the processor 1 according to this embodiment is able to perform the multiplication processing S1, the comparison processing S2, and the replacement processing S3 in accordance with a single vector instruction, and therefore, perform the processing of generating an HOG feature quantity even more quickly.

(Variations)

Next, variations of the exemplary embodiment described above will be enumerated one after another. Optionally, the variations to be described below may be adopted in combination as appropriate. Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Furthermore, not every aspect of the present disclosure, including the exemplary embodiment described above, is implemented as the processor 1. Optionally, an aspect of the present disclosure, including the exemplary embodiment described above, may also be implemented as a method for controlling the processor 1, for example.

A method for controlling the processor described above includes processing that allows an instruction to be executed using a first register that stores a first data element, a second register that stores a second data element, and a third register that stores a first value. The instruction is a single instruction to perform multiplication processing and comparison processing. The multiplication processing includes obtaining a multiplication result by multiplying together the first data element stored in the first register and the first value stored in the third register. The comparison processing includes comparing the multiplication result with the second data element stored in the second register.

In the following description of variations, any constituent element of the variations, having the same function as a counterpart of the exemplary embodiment described above, will be designated by the same reference numeral as that counterpart's, and description thereof will be omitted herein.

(First Variation)

In the exemplary embodiment described above, the boundary value inverse number 1/A0-1/A7 sometimes has a value equal to or less than one, and therefore, the left side of the inequality on each line of Table 2 ((1/A0×(L1−L7)), ..., and (1/A7×(L1−L7)) may also have a numerical value equal to or less than one. Supposing 1/A0-1/A7 and (L1−L7) are eight-bit numbers and (L1−L7) is an integer, the left side will be a 16-bit number. However, if the left side has a numerical value equal to or less than one described above, then the decimal point of the numerical value on the left side appears at the eighth bit location as counted from the right end (i.e., from the least significant bit) of a bit string representing the numerical value. Meanwhile, the numerical value on the right side (L5−L3) of the inequality on each line of Table 2 may be an integer, for example, and therefore, the decimal point of the numerical value on the right side appears at the right end of a bit string representing the numerical value. Optionally, the decimal point of the numerical value on the right side may be brought into agreement with the decimal point of the numerical value on the left side such a fixed point operation may be carried out when the boundary value decision is made. That is to say, the boundary value decision may be made with the numerical value on the right side shifted to the left to a predetermined degree (typically, by a predetermined number of bits (of 8 bits, for example)). Note that the predetermined number of bits to shift may be sets at a fixed value according to the data type of the second data element VD21-VD24.

Figure 9:
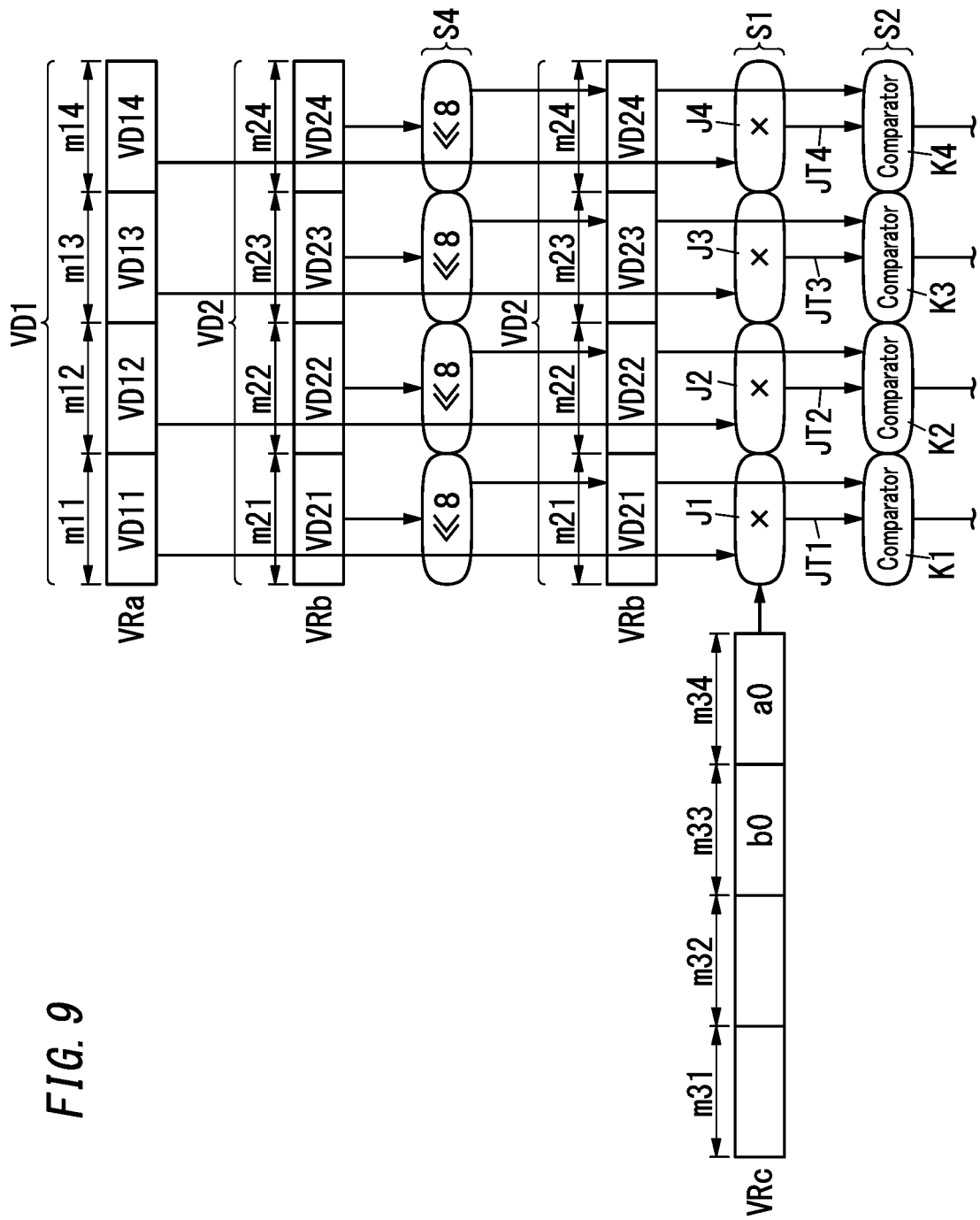
FIG. 9 is a schematic representation illustrating a part of the flow of the processing to be performed by a processor according to a first variation.

More specifically, shift processing S4 (decimal point shift processing) of shifting the second data elements VD21-VD24 in the storage areas m21-m24 of the second vector register VRb to the left by a predetermined number of bits (of 8 bits, for example) may be added to the vector instruction as shown in FIG. 9. Then, the second data elements VD21-VD24 shifted by the predetermined number of bits are input to their associated comparators K1-K4. The rest of the processing will be performed in the same way as in the exemplary embodiment described above.

TABLE 4

| | |
|---|---|
| Mnemonic | pgrad.[D] VRd, VRa, VRb, VRc |
| Data Types | u8, s8, u16, s16, u32, s32, u64, s64 |
| Read/Write | read: VRa, VRb, VRc, VRd, write: VRd |
| Operation | If [D] is u8:<br>VRd[7:0]←(umul(VRa[7:0], VRc[7:0])>(VRb[7:0]<<8)) ? VRc[15:8] : VRd[7:0]<br>VRd[15:8]←(umul(VRa[15:8], VRc[7:0])>(VRb[15:8]<<8)) ? VRc[15:8] : VRd[15:8]<br>⋮<br>VRd[127:120]←(umul(VRa[127:120], VRc[7:0])>(VRb[127:120]<<8)) ? VRc[15:8] : VRd[127:120]<br>If [D] is u16:<br>VRd[15:0]←(umul(VRa[15:0], VRc[15:0])>(VRb[15:0]<<16)) ? VRc[31:16] : VRd[15:0]<br>VRd[31:16]←(umul(VRa[31:16], VRc[15:0])>(VRb[31:16]<<16)) ? VRc[31:16] : VRd[31:16]<br>⋮<br>VRd[127:112]←(umul(VRa[127:112], VRc[15:0])>(VRb[127:112]<<16)) ? VRc[31:16] : VRd[127:112] |

Table 4 shows exemplary "Mnemonic," "Data Types," "Read/Write," and "Operation" in a situation where the vector instruction according to this variation is loaded into the processor 1. In this variation, floating point numbers are not effective, and therefore, are not included in "Data Types."

This configuration allows the decimal point of the second data elements VD21-VD24 to be brought either into agreement with, or closer to, the decimal point of the multiplication results JT1-JT4 obtained by the multiplication processing S1. This increases the computational accuracy in the comparison processing S2, thus enabling an HOG feature quantity to be generated more quickly.

(Second Variation)

In the first variation described above, the predetermined number of bits to shift is set at a fixed value according to the data type of the second data elements VD21-VD24, for example. Alternatively, the predetermined number of bits to shift may also be specified as an immediate value by an instruction (vector instruction). In other words, the instruction may include a variable (immediate value) replaceable with a predetermined number of bits to shift entered.

TABLE 5

| | |
|---|---|
| Mnemonic | pgrad.[D] VRd, VRa, VRb, VRc, Imm |
| Data Types | u8, s8, u16, s16, u32, s32, u64, s64 |
| Read/Write | read: VRa, VRb, VRc, VRd, write: VRd |
| Operation | If [D] is u8:<br>　VRd[7:0]←(umul(VRa[7:0], VRc[7:0])>(VRb[7:0]<<Imm)) ? VRc[15:8] : VRd[7:0]<br>　VRd[15:8]←(umul(VRa[15:8], VRc[7:0])>(VRb[15:8]<<Imm)) ? VRc[15:8] : VRd[15:8]<br>　　　⋮<br>　VRd[127:120]←(umul(VRa[127:120], VRc[7:0])>(VRb[127:120]<<Imm)) ? VRc[15:8] : VRd[127:120]<br>If [D] is ul6:<br>　VRd[15:0]←(umul(VRa[15:0], VRc[15:0])>(VRb[15:0]<<Imm)) ? VRc[31:16] : VRd[15:0]<br>　VRd[31:16]←(umul(VRa[31:16], VRc[15:0])>(VRb[31:16]<<Imm)) ? VRc[31:16] : VRd[31:16]<br>　　　⋮<br>　VRd[127:112]←(umul(VRa[127:112], VRc[15:0])>(VRb[127:112]<<Imm)) ? VRc[31:16] : VRd[127:112] |

Table 5 shows exemplary "Mnemonic," "Data Types," "Read/Write," and "Operation" in a situation where the vector instruction according to this variation is loaded into the processor 1. In the "Mnemonic" column of Table 3, "Imm" denotes an immediate value. The predetermined number of bits to shift may be set according to the boundary value inverse number by adjusting this immediate value to input according to the value of the boundary value inverse number, for example. In this variation, floating point numbers are not effective, and therefore, are not included in "Data Types."

This configuration allows the predetermined number of bits to shift to be changed according to the value input as the variable (immediate value). The decimal point of the multiplication results JT1-JT4 obtained by the multiplication processing S1 varies according to the boundary value inverse number a0-a7. Thus, changing the value input as the variable, and thereby changing the predetermined number of bits to shift, according to the boundary value inverse number a0-a7 allows the computational accuracy to be increased in the comparison processing S2 even when the boundary value inverse number a0-a7 varies.

(Third Variation)

Figure 10A:
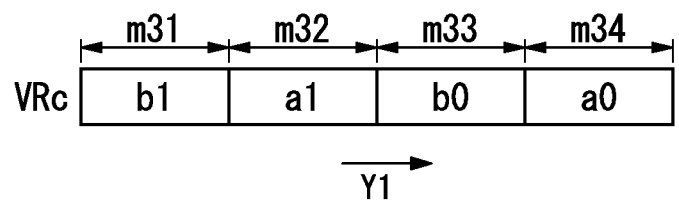
FIG. 10A is a schematic representation showing a state of a third vector register yet to be subjected to shift processing according to a third variation.

In the exemplary embodiment described above, the set of the boundary value inverse number a0 and gradient class b0 stored in the storage areas m33, m34 of the third vector register VRc is exchanged sequentially from the next set (a1, b1) through the last set (a7, b7). This allows the boundary value inverse number and gradient class for use in the processing S1, S3 to be supplied to the storage areas m33, m34. Meanwhile, according to this variation, multiple sets (such as a set (a0, b0) and a set (a1, b1)) are stored in advance in the third vector register VRc as shown in FIG. 10A. Then, the boundary value inverse number and gradient class for use in the processing S1, S3 are supplied to the storage areas m33, m34 by shifting the multiple sets in one direction Y1 on a set by set basis as shown in FIG. 10B.

In FIG. 10A, a set (a0, b0) and another set (a1, b1) are stored as multiple sets in the third vector register VRc so as to be arranged in line. Specifically, the set (a0, b0) is stored in storage areas m33, m34 and the set (a1, b1) is stored in storage areas m31, m32 adjacent to the storage areas m33, m34.

As in the exemplary embodiment described above, the vector instruction according to this variation also instructs reading, as the boundary value inverse number a0 for use in the multiplication processing S1 and the gradient class b0 for use in the replacement processing S3, the boundary value inverse number and gradient class stored in the storage areas m33, m34 (predetermined areas) in the third vector register VRc.

Figure 10B:
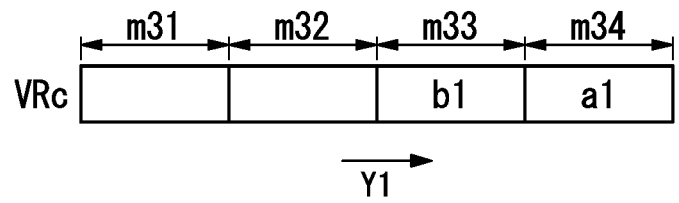
FIG. 10B is a schematic representation showing a state of the third vector register subjected to the shift processing.

The vector instruction according to this variation instructs performing the series of processing S1-S3 and then further performing shift processing of shifting, in the one direction Y1 (first shift direction), the multiple sets stored in the third vector register VRc by one set (see FIG. 10B). Note that the one direction Y1 is a direction pointing from the storage area m31 toward the storage area m34. In other words, the one direction Y1 according to this variation is a direction from the most significant bit toward the least significant bit. This allows the set (a1, b1) stored in the storage areas m31, m32 (adjacent areas) adjacent to the storage areas m33, m34 (predetermined areas) in the third vector register VRc to be moved to the storage areas m33, m34 (predetermined areas). As a result, the boundary value inverse number a1 and gradient class b1 for use in the next series of processing S1-S3 are stored in (supplied to) the storage areas m33, m34. Alternatively, the sets (a0, b0) and (a1, b1) may be arranged in reverse order in the third vector register VRc such that the set (a0, b0) is read out from the storage areas m31, m32 to perform the series of processing S1-S3 and then the set (a1, b1) in the storage areas m33, m34 is shifted by one set in the direction opposite from the one direction Y1 to the storage areas m31, m32.

Note that as a result of the shift processing described above, the set (a0, b0) is eliminated from the storage areas in the third vector register VRc and erased. Also, the storage areas m31, m32 are initialized by storing zeros there after the shift processing. Alternatively, the storage areas m31, m32 may also be initialized by storing non-zero values (such as ones) there.

Table 6 shows exemplary "Mnemonic," "Data Types," "Read/Write," and "Operation" in a situation where the vector instruction according to this variation is loaded into the processor 1.

TABLE 6

| | |
|---|---|
| Mnemonic | pgrad.[D] VRd, VRa, VRb, VRc |
| Data Types | u8, s8, u16, s16, u32, s32, u64, s64, f16, f32, f64 |
| Read/Write | read: VRa, VRb, VRc, VRd, write: VRc, VRd |
| Operation | If [D] is u8:<br>　VRd[7:0]←(umul(VRa[7:0], VRc[7:0])>VRb[7:0]) ? VRc[15:8] : VRd[7:0]<br>　VRd[15:8]←(umul(VRa[15:8], VRc[7:0])>VRb[15:8]) ? VRc[15:8] : VRd[15:8]<br>　　　⋮<br>　VRd[127:120]←(umul(VRa[127:120], VRc[7:0])>VRb[127:120]) ? VRc[15:8] : VRd[127:120] |

TABLE 6-continued

VRc[111:0]←VRc[127:16], VRc[127:112]←0
If [D] is u16:
VRd[15:0]←(umul(VRa[15:0], VRc[15:0])>VRb[15:0]) ? VRc[31:16] : VRd[15:0]
VRd[31:16]←(umul(VRa[31:16], VRc[15:0])>VRb[31:16]) ? VRc[31:16] : VRd[31:16]
                ⋮
VRd[127:112]←(umul(VRa[127:112], VRc[15:0])>VRb[127:112]) ? VRc[31:16] : VRd[127:112]
VRc[95:0]←VRc[127:32], VRc[127:96]←0

In the "Operation" column of Table 6, the part "VRc[111:0]←VRc[127:16], VRc[127:112]<←0" and other similar part correspond to the shift processing.

As can be seen from the foregoing description, according to this variation, storing multiple sets (each including a boundary value inverse number and a gradient class) in the third vector register VRc and shifting the multiple sets allows the multiple sets to be sequentially moved one by one to the storage areas m33, m34 in the third vector register VRc. This reduces the number of times that the sets (each including the boundary value inverse number and the gradient class) for use in the series of processing S1-S3 need to be permuted in the third vector register VRc, thus increasing the processing rate of the series of processing S1-S3. Optionally, storing all sets of the boundary value inverse numbers and gradient classes (i.e., every set from the first set (a0, b0) through the last set (a7, b7)) in the third vector register VRc eliminates the need to permute the sets for use in the series of processing S1-S3.

(Fourth Variation)

A fourth variation is a modification of the third variation. According to the fourth variation, the processor 1 further includes a fifth vector register VRc+1 (fifth register) as shown in FIG. 11A. The fifth vector register VRc+1, as well as the third vector register VRc, has a plurality of (e.g., four in this variation) storage areas m51-m54. The register number c+1 of the fifth vector register VRc+1 is in series with the register number c of the third vector register VRc. According to this variation, the register number c+1 of the fifth vector register VRc+1 is in series with the register number c of the third vector register VRc. However, this is only an example of the present disclosure and should not be construed as limiting. Alternatively, the fifth vector register may also be designated by VRe and its register number may be e. As used herein, the "register number" refers to an identification number assigned to a register for use in processing to specify the register.

As shown in FIG. 11A, in the storage areas m31-m34 of the third vector register VRc, stored are multiple (e.g., two in this variation) sets (i.e., a set (a0, b0) and a set (a1, b1)) to be sequentially arranged in line from the least significant bit toward the most significant bit. In the storage areas m51-m54 of the fifth vector register VRc+1, stored are multiple (e.g., two in this variation) sets (i.e., a set (a2, b2) and a set (a3, b3)) to be sequentially arranged in line from the least significant bit toward the most significant bit. That is to say, among all of the multiple sets (every set from the first set (a0, b0) through the last set (a7, b7)), four consecutive sets (e.g., from the set (a0, b0) through the set (a3, b3)) are stored in the third and fifth vector registers VRc, VRc+1. Note that data a0, b0, a1, b1 are respectively stored in the storage areas m34-m31 of the third vector register VRc and data a2, b2, a3, b3 are respectively stored in the storage areas m54-m51 of the fifth vector register VRc+1.

The shift processing according to this variation is a modification of the shift processing according to the third variation and includes first processing and second processing to be described below.

The first processing includes shifting, in one direction Y2 (second shift direction), the multiple sets (such as a set (a2, b2) and a set (a3, b3)) stored in the fifth vector register VRc+1 by one set (see FIG. 10B). Note that the one direction Y2 is a direction pointing from the storage area m51 toward the storage area m54. In other words, the one direction Y2 according to this variation is a direction from the most significant bit toward the least significant bit in the fifth vector register VRc+1. The storage areas m51, m52 vacated through the first processing are initialized by storing zeros there (see FIG. 11B). Alternatively, the storage areas m51, m52 may also be initialized by storing non-zero values (such as ones) there.

The second processing includes moving the set (a2, b2) in the fifth vector register VRc+1 to the storage areas m31, m32 located adjacent to, and backward of, the set (a1, b1) in the third vector register VRc as shown in FIG. 11B. As used herein, if one set is "located adjacent to, and backward of" another set, the former set is adjacent to the latter set in a direction opposite from the one direction Y1. Note that the set (a2, b2) is a set located at one end in the one direction Y2 among the multiple sets (i.e., the set (a2, b2) and the set (a3, b3)) stored and arranged in line in the fifth vector register VRc+1. The set (a1, b1) is a set located at one end in the direction opposite from the one direction Y1 among the multiple sets (i.e., the set (a0, b0) and the set (a1, b1)) stored and arranged in line in the third vector register VRc.

According to this variation, as a result of the shift processing, the multiple sets (i.e., the set (a0, b0) and the set (a1, b1)) stored in the third vector register VRc are shifted by one set in the one direction Y1. Through this shift processing, the multiple sets (i.e., the set (a2, b2) and the set (a3, b3)) stored in the fifth vector register VRc-F1 are also shifted by one set in the one direction Y2 in parallel with, or after, the shift of the former sets. In addition, as a result of the shift processing, the set (i.e., the set (a2, b2)) located at one end in the one direction Y2 in the fifth vector register VRc+1 is supplemented to be located adjacent to, and backward of, the multiple sets in the third vector register VRc. This allows, even when multiple sets (e.g., four sets from the set (a0, b0) through the set (a3, b3)) are stored separately in the two vector registers VRc, VRc-F1, these multiple sets to be processed as if the multiple sets were stored in a single vector register.

The mnemonic of the vector instruction according to this variation may be expressed as shown in the following Table 7:

TABLE 7

| Mnemonic | pgrad.[D] | VRd, VRa, VRb, VRc, VRc+1 |
| --- | --- | --- |

Note that the sets (e.g., the set (a0, b0) and the set (a1, b1)) stored in the third vector register VRc correspond to the first set defined in the appended claims and the sets (e.g., the set (a2, b2) and the set (a3, b3)) stored in the fifth vector register VRc+1 correspond to the second set defined in the appended claims.

(Fifth Variation)

In the third variation, the multiple sets (such as the set (a0, b0) and the set (a1, b1)) in the third vector register VRc are read out from the third vector register VRc by being shifted on a set by set basis to the storage areas m33, m34. Alternatively, the vector instruction may specify the storage areas in which the set to read is stored in the third vector register VRc without shifting the multiple sets in the third vector register VRc as described above. Then, the boundary value inverse number (first value) and the gradient class (second value) may be read out from the specified storage areas.

More specifically, the multiple sets (such as the set (a0, b0) and the set (a1, b1)) in the third vector register VRc are stored in mutually different storage areas in the third vector register VRc. Specifically, the set (a0, b0) is stored in the storage areas m33, m34 and the set (a1, b1) is stored in the storage areas m31, m32.

The vector instruction according to this variation includes a plurality of (e.g., two in this variation) mnemonics (instruction mnemonics). The plurality of mnemonics instructs reading, as the boundary value inverse numbers for use in the multiplication processing S1 and the gradient classes for use in the replacement processing S3, the boundary value inverse numbers and gradient classes of the sets stored in mutually different storage areas among the multiple sets.

Figure 12:
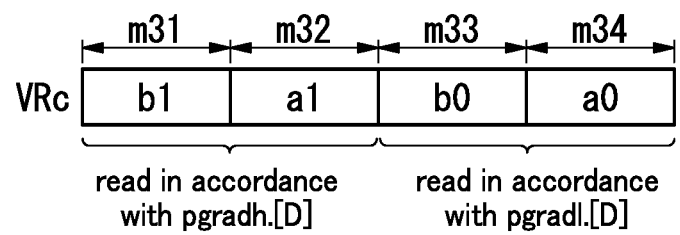
FIG. 12 is a schematic representation illustrating two sets, each including a boundary value inverse number and a gradient class, to be read in accordance with a plurality of mnemonics according to a fifth variation.

Specifically, suppose the multiple sets are two sets (such as the set (a0, b0) and the set (a1, b1)) as shown in FIG. 12. In that case, the vector instruction according to this variation includes pgradh.[D] and pgradl.[D] as two mnemonics. The mnemonic pgradh.[D] instructs reading, as the boundary value inverse number for use in the multiplication processing S1 and the gradient class for use in the replacement processing S3, the boundary value inverse number a1 and the gradient class b1 from the storage areas m31, m32 in which one set located closer to the most significant bit (i.e., the set (a1, b1)) out of the two sets is stored. The mnemonic pgradl.[D] instructs reading the boundary value inverse number a0 and the gradient class b0 from the storage areas m33, m34 in which one set located closer to the least significant bit (i.e., the set (a0, b0)) out of the two sets (i.e., the set (a0, b0) and the set (a1, b1)) is stored.

When the vector instruction is loaded into the processor 1, pgradh.[D] is used as the mnemonic to read the boundary value inverse number a1 and the gradient class b1 from the set located closer to the most significant bit (i.e., the set (a1, b1)). On the other hand, pgradl.[D] is used as the mnemonic to read the boundary value inverse number a0 and the gradient class b0 from the set located closer to the least significant bit (i.e., the set (a0, b0)).

According to this variation, the boundary value inverse numbers and gradient classes of the sets (such as the set (a0, b0) and the set (a1, b1)) stored in mutually different storage areas among the multiple sets may be read from the third vector register VRc depending on which of the plurality of mnemonics (such as pgradh. [D] and pgradl. [D]) is used. That is to say, the boundary value inverse numbers and gradient classes of the sets (such as the set (a0, b0) and the set (a1, b1)) stored in mutually different storage areas may be read with the multiple sets not shifted in the third vector register VRc as in the third and fourth variations. This allows the processing of generating an HOG feature quantity to be performed at an increased rate.

Optionally, to specify which of the multiple sets stored in the third vector register VRc is used, an immediate value "Imm" may be added to the mnemonics with the mnemonic pgrad. [D] unchanged such that the set may be specified with the immediate value. In that case, the plurality of (e.g., two in this variation) sets stored in the third vector register VRc may be associated with 0 and 1 in this order from the least significant bit toward the most significant bit such that the set located closer to the least significant bit may be read when zero is specified with the immediate value and that the set located closer to the most significant bit may be read when one is specified with the immediate value.

(Sixth Variation)

In the exemplary embodiment described above, the first data elements VD11-VD14 and the second data elements VD21-VD24 (i.e., the data of the input image) have the same bit width as the third data elements VD31-VD34 (i.e., the HOG feature quantity). However, the bit width of the first and second data elements VD11-VD14 and VD21-VD24 may be different from the bit width of the third data elements VD31-VD34.

Figure 13:
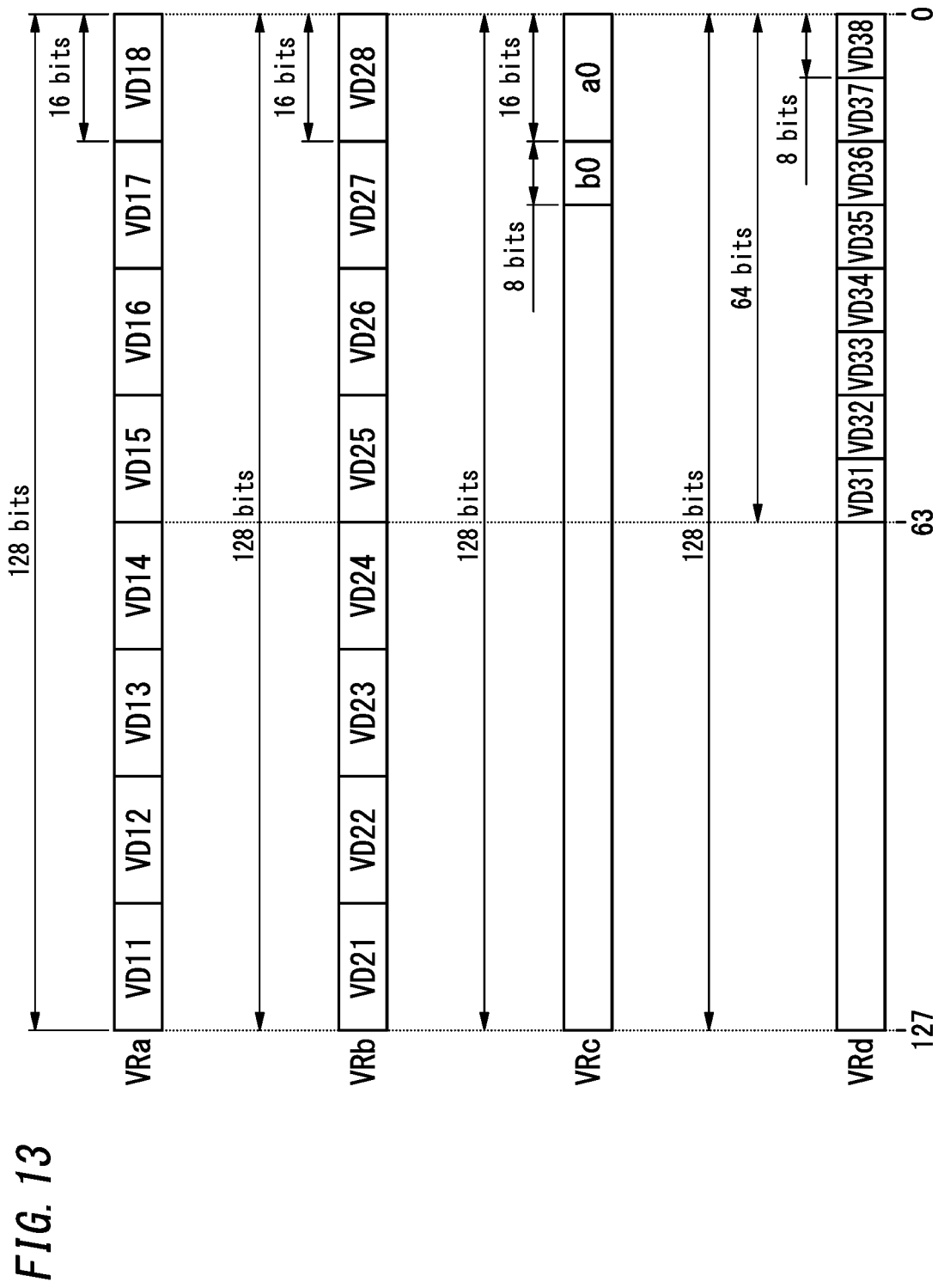
FIG. 13 illustrates how a processor according to a sixth variation stores data in first to fourth vector registers when a data size of a first data element is larger than that of a third data element.

As shown in FIG. 13, the bit width of the first data elements VD11-VD18 and the second data elements VD21-VD28 may be greater than the bit width of the third data elements VD31-VD38. In the example illustrated in FIG. 13, the first data elements VD11-VD18 and the second data elements VD21-VD28 each have a bit width of 16 bits (e.g., when the data type is u16) and the third data elements VD31-VD38 have a bit width of 8 bits. The boundary value inverse number a0 has a size of 16 bits and the gradient class b0 has a size of 8 bits. The first to fourth vector registers VRa-VRd each have a bit width of 128 bits. Alternatively, the bit width of the storage area to store the gradient class b0 may be set at 16 bits so as to agree with the size of the boundary value inverse number a0. In that case, the effective data of the gradient class b0 will be 8 bits out of the 16 bits.

In the example shown in FIG. 13, eight first data elements VD11-VD18 are stored in the first vector register VRa. Likewise, eight second data elements VD21-VD28 are stored in the second vector register VRb as well. The boundary value inverse number a0 and the gradient class b0 are stored as two data in the third vector register VRc. Eight third data elements VD31-VD38 are also stored in the fourth vector register VRd. The third data elements VD31-VD38 may be stored in the storage area with a width of 64 bits that forms the less significant half of the fourth vector register VRd, for example. In that case, the other storage area with a width of 64 bits that forms the more significant half of the fourth vector register VRd will not be used but remain vacant. The boundary value inverse number a0 and the gradient class b0 may be stored in the storage area with a width of 24 bits that forms the least significant part of the third vector register VRc, for example. The other storage area with a width of 104 bits of the third vector register VRc will not be used but remain vacant.

Exemplary "Mnemonic," "Data Types," "Read/Write," and "Operation" when the vector instruction for such a situation is loaded into the processor 1 are as shown in the following Table 8:

TABLE 8

| | |
|---|---|
| Mnemonic | pgrad8.[D] VRd, VRa, VRb, VRc |
| Data Types | u8, s8, u16, s16, u32, s32, u64, s64, f16, f32, f64 |
| Read/Write | read: VRa, VRb, VRc, VRd, write: VRd |
| Operation | If [D] is u16:<br>    VRd[7:0]←(umul(VRa[15:0], VRc[15:0])>VRb[15:0]) ? VRc[23:16] : VRd[7:0]<br>    VRd[15:8]←(umul(VRa[31:16], VRc[15:0])>VRb[31:16]) ? VRc[23:16] : VRd[15:8]<br>    ⋮<br>    VRd[63:56]←(umul(VRa[127:112], VRc[15:0])>VRb[127:112]) ? VRc[23:16] : VRd[63:56] |

In the "Mnemonic" column of Table 8, "8" in pgrad8. [D] indicates the bit width of the data elements (i.e., the third data elements VD31-VD38) to be stored in VRd.

Figure 14:
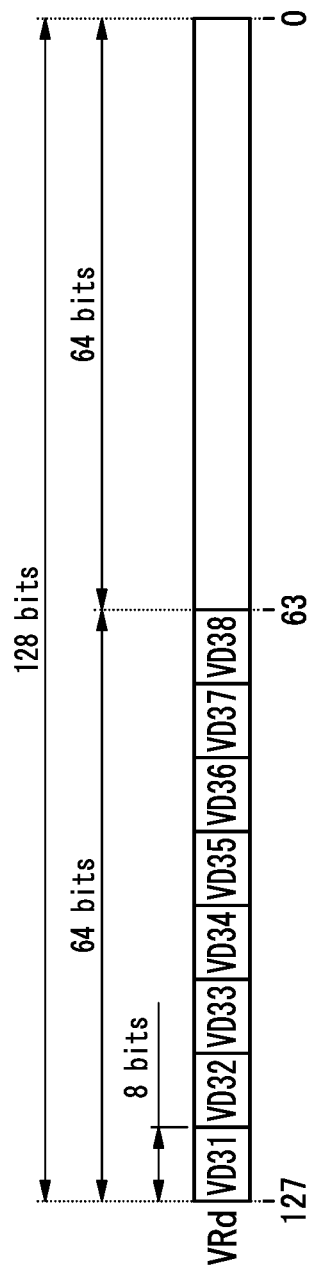
FIG. 14 illustrates how the processor may store data in the fourth vector register in a different manner.

Alternatively, the eight third data elements VD31-VD38 may also be stored in the storage area with a width of 64 bits that form the more significant half of the fourth vector register VRd as shown in FIG. 14. In that case, the storage area with a width of 64 bits that forms the less significant half of the fourth vector register VRd will not be used but remain vacant.

Optionally, the mnemonic in the example shown in FIG. 14 may be designated by pgrad8*h*.[D] and the mnemonic in the example shown in FIG. 13 may be designated by pgrad8*l*.[D]. This allows the processor 1 to choose either the storage area that forms the more significant half of the fourth vector register VRd or the storage area that forms the less significant half thereof as the storage area to store the third data elements VD31-VD38 depending on which of the two mnemonics (pgrad8*h*. [D], pgrad8*l*. [D]) is used.

Figure 15:
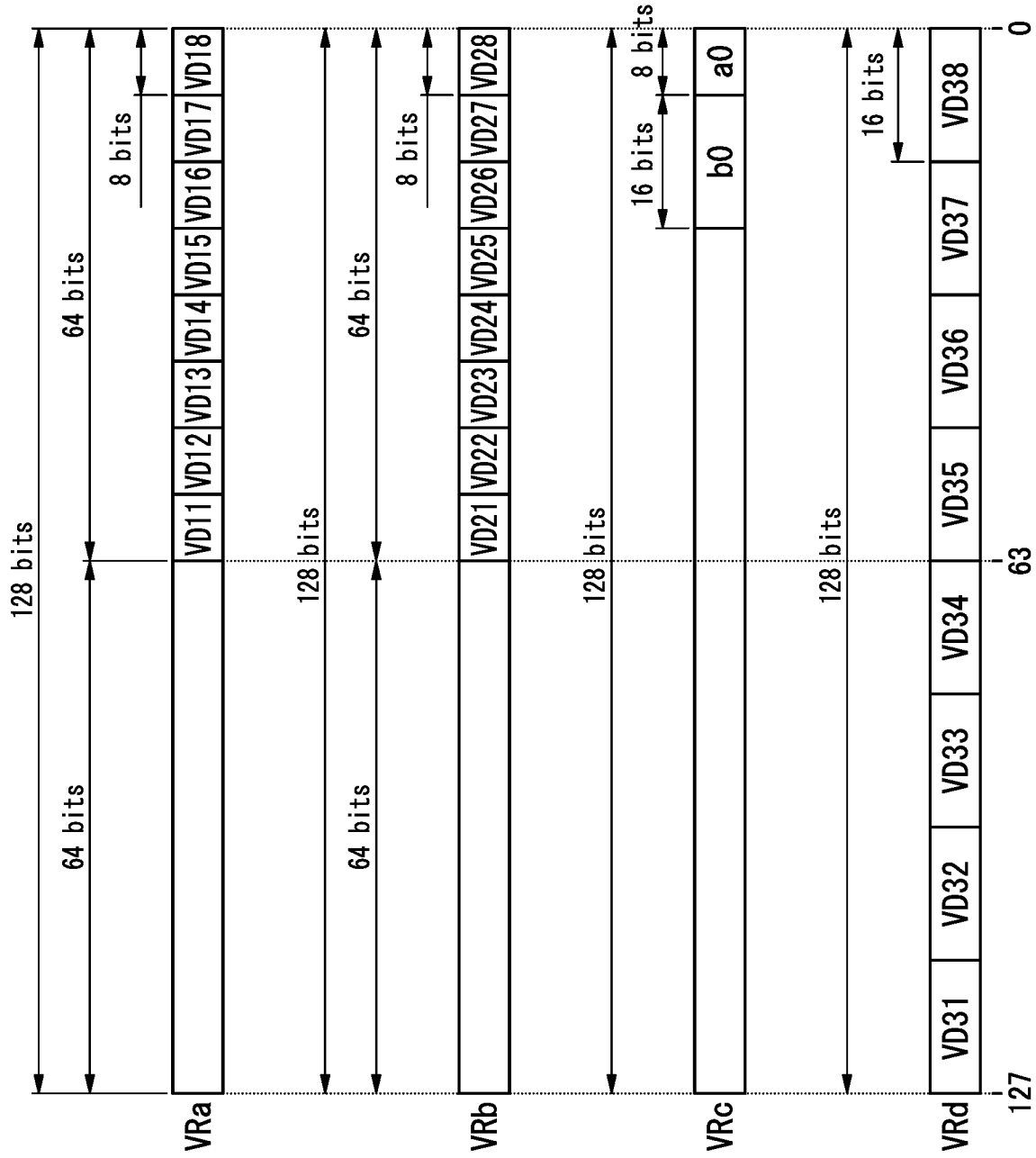
FIG. 15 illustrates how the processor stores data in the first to fourth vector registers when the data size of the first data element is smaller than the third data element.

Alternatively, as shown in FIG. 15, the bit width of the first data elements VD11-VD18 and the second data elements VD21-VD28 may be less than the bit width of the third data elements VD31-VD38. In the example illustrated in FIG. 15, the first data elements VD11-VD18 and the second data elements VD21-VD28 each have a bit width of 8 bits (e.g., when the data type is 8*u*) and the third data elements each have a bit width of 16 bits. The first to fourth vector registers VRa-VRd each have a bit width of 128 bits.

In the example shown in FIG. 15, eight first data elements VD11-VD18 are stored in the first vector register VRa. Likewise, eight second data elements VD21-VD28 are also stored in the second vector register VRb. The boundary value inverse number a0 and the gradient class b0 are stored as two data in the third vector register VRc. Eight third data elements VD31-VD38 are also stored in the fourth vector register VRd. The first data elements VD11-VD18 may be stored in the storage area with a width of 64 bits that forms the less significant half of the first vector register VRa, for example. In that case, the other storage area of with a width of 64 bits that forms the more significant half of the first vector register VRa will not be used but remain vacant. Likewise, the second data elements VD21-VD28 may also be stored in the storage area with a width of 64 bits that forms the less significant half of the second vector register VRb, for example. In that case, the other storage area with a width of 64 bits that forms the more significant half of the second vector register VRb will not be used but remain vacant. The boundary value inverse number a0 and the gradient class b0 may be stored in the storage area with a width of 24 bits that forms the least significant part of the third vector register VRc, for example. The other storage area with a width of 104 bits of the third vector register VRc will not be used but remain vacant. Alternatively, the bit width of the storage area to store the boundary value inverse number a0 may be set at 16 bits so as to agree with the size of the gradient class b0. In that case, the effective data of the boundary value inverse number a0 will be 8 bits out of the 16 bits.

Exemplary "Mnemonic," "Data Types," "Read/Write," and "Operation" when the vector instruction for such a situation is loaded into the processor 1 are as shown in the following Table 9:

TABLE 9

| | |
|---|---|
| Mnemonic | pgrad16.[D] VRd, VRa, VRb, VRc |
| Data Types | u8, s8, u16, s16, u32, s32, u64, s64, f16, f32, f64 |
| Read/Write | read: VRa, VRb, VRc, VRd, write: VRd |
| Operation | If [D] is u8:<br>    VRd[15:0]←(umul(VRa[7:0], VRc[7:0])>VRb[7:0]) ? VRc[23:8] : VRd[15:0]<br>    VRd[31:16]← (umul(VRa[15:8], VRc[7:0])>VRb[15:8]) ? VRc[23:8] : VRd[31:16]<br>    ⋮<br>    VRd[127:112]←(umul(VRa[63:56], VRc[7:0])>VRb[63:56]) ? VRc[23:8] : VRd[127:112] |

In the "Mnemonic" column of Table 9, "16" in pgrad16. [D] indicates the bit width of the data elements (i.e., the third data elements VD31-VD38) to be stored in VRd.

Figure 16:
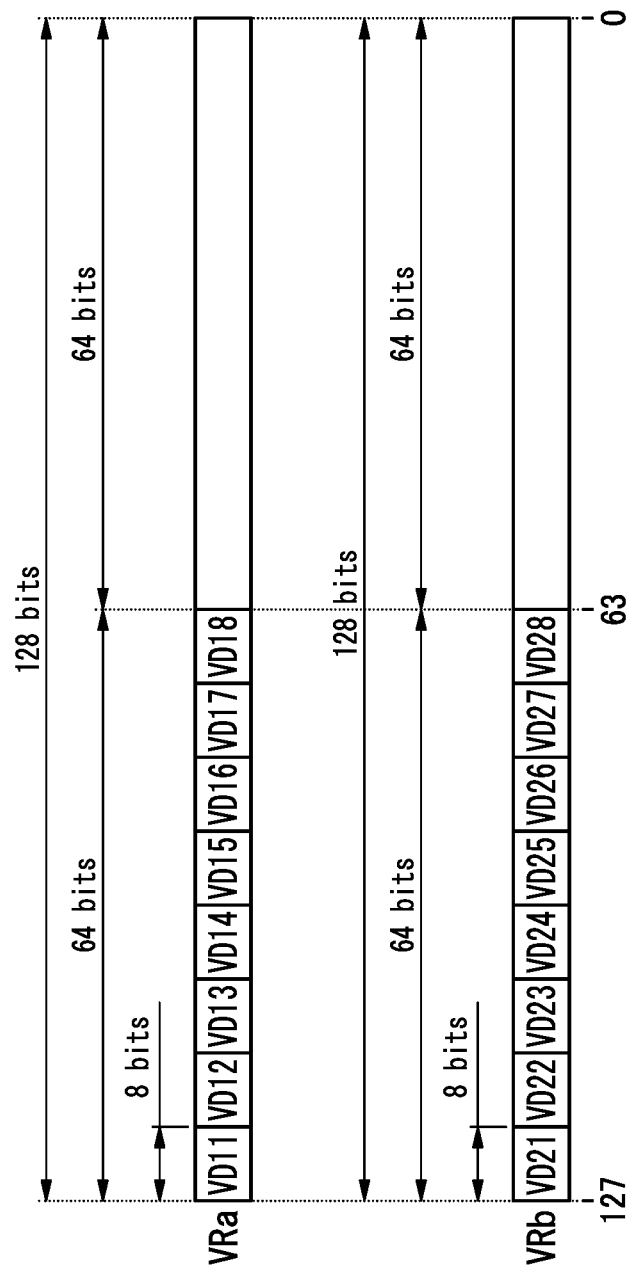
FIG. 16 illustrates how the processor may store data in the fourth vector register in a different manner.

Alternatively, the eight first data elements VD11-VD18 may also be stored in the storage area with a width of 64 bits that form the more significant half of the first vector register VRa as shown in FIG. 16. In that case, the storage area with a width of 64 bits that forms the less significant half of the first vector register VRa will not be used but remain vacant. Likewise, the eight second data elements VD21-VD28 may also be stored in the storage area with a width of 64 bits that form the more significant half of the second vector register VRb. In that case, the storage area with a width of 64 bits that forms the less significant half of the second vector register VRb will not be used but remain vacant.

Optionally, the mnemonic in the example shown in FIG. 16 may be designated by pgradl6*h*.[D] and the mnemonic in the example shown in FIG. 15 may be designated by pgrad16*l*.[D]. This allows the processor 1 to choose either the storage areas that form the more significant halves of the first and second vector registers VRa and VRb or the storage areas that form the less significant halves thereof as the storage areas to read the first data elements VD11-VD18 and the second data elements VRb from depending on which of the two mnemonics (pgrad16*h*.[D], pgrad16*l*.[D]) is used.

(Seventh Variation)

In the exemplary embodiment described above, the mnemonic of the vector instruction requires using the first to fourth vector registers VRa-VRd as shown in the following Table 10:

TABLE 10

| Mnemonic | pgrad.[D] VRd, VRa, VRb, VRc |
|---|---|

Figure 17A:
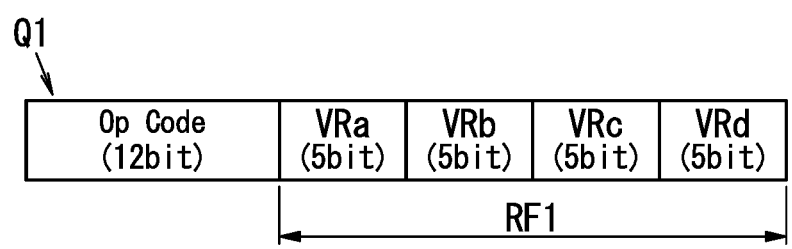
FIG. 17A is a schematic representation showing an exemplary instruction code according to an embodiment.

Thus, the instruction code Q1 of the vector instruction needs to specify the register numbers a-d of the first to fourth vector registers VRa-VRd as shown in FIG. 17A. As used herein, the "register number" is an identification number assigned to a register for use in processing to specify the register. The instruction code Q1 needs to describe an operation code that defines an instruction and a register number that specifies a register. The instruction code Q1 has a constant instruction length (of 32 bits, for example). Thus, specifying the register numbers a-d of the four vector registers VRa-VRd would extend the bit length of a register number specifying field RF1 and shorten the bit length of the operation code. As used herein, the "register number specifying field RF1" is a field to specify the register number. This prevents the instruction code Q1 from defining a larger number of instructions. In the example shown in FIG. 17A, the operation code has a bit length of 12 bits and each register number a-d has a bit length of 5 bits. Note that in this variation, the instruction code Q1 is supposed to have an instruction length of 32 bits and the processor is supposed to be implemented to have 32 vector registers, for example.

In this variation, at least one vector register selected from the group consisting of the first vector register VRa, the second vector register VRb, the third vector register VRc, and the fourth vector register VRd is supposed to have a register number in series with the register number of another vector register selected from the same group. The former register number (hereinafter referred to as a "first register number") in series with the latter register number (hereinafter referred to as a "second register number") will be automatically determined, when the second register number is determined, to be a register number either next or previous to the second register number. Thus, there is no need to describe, in the instruction code, the first register number in series with the second register number. This allows the operation code of the instruction code to have an increased bit length, thus enabling a larger number of instructions to be defined.

For example, the register number b of the second vector register VRb may be set at a+1 which is in series with the register number a of the first vector register VRa. That is to say, register number b=a+1 may be satisfied. In that case, when the register number a of the first vector register VRa is specified, the register number a+1 of the second vector register VRb will be automatically determined to be a register number next to the register number a. In that case, the mnemonic will be as shown in the following Table 11:

TABLE 11

| Mnemonic | pgrad.[D] VRd, VRa, VRa+1, VRc |
|---|---|

Figure 17B:
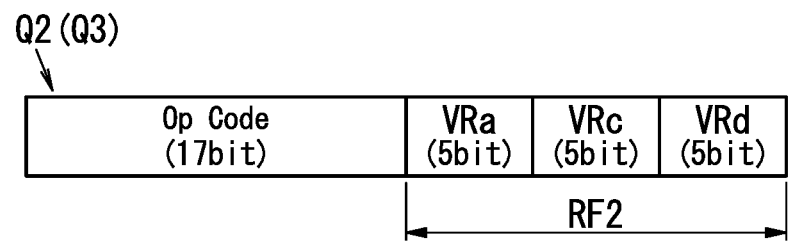
FIG. 17B is a schematic representation showing an exemplary instruction code according to a seventh variation.

Also, in that case, the instruction code Q2 describes only the register numbers a, c, d of the three vector registers VRa, VRc, VRd other than the register number a+1 of the second vector register VRb as shown in FIG. 17B. Since the register number a+1 of the second vector register VRb is not described in the instruction code Q2 in that case, the register number specifying field RF2 will have a shorter bit length and the operation code will have a longer bit length accordingly.

Alternatively, the register number b of the second vector register VRb may also be set at d+1 which is in series with the register number d of the fourth vector register VRd. That is to say, register number b=d+1 may be satisfied. In that case, the mnemonic will be as shown in the following Table 12. Also, the instruction code Q3 in that case will be shown in FIG. 17B. Note that there are various possible combinations as to which of the vector registers VRa-VRd a given vector register should have a serial register number with and various modifications may be made depending on a design choice or any other factor.

TABLE 12

| Mnemonic | pgrad.[D] VRd, VRa, VRd+1, VRc |
|---|---|

(Eighth Variation)

In the seventh variation, the bit length of the register number specifying field RF2 is shortened by setting the register number b of the second vector register VRb at a number in series with the register number of another vector register, for example. However, the bit length of the register number specifying field RF2 does not have to be shortened in this way. Alternatively, the bit length of the register number specifying field may also be shortened by fixing the register number of at least one of the four vector registers VRa-VRd, for example (i.e., using a fixed register number). Fixing the register number eliminates the need to specify the register number in the instruction code. This makes the bit length of the register number specifying field shorter and the operation code longer accordingly.

For example, the register number c of the third vector register VRc may be fixed at number zero. That is to say, register number c=0 may be satisfied. The mnemonic in that case may describe the third vector register VRc as in the upper row of Table 13 or may not describe the vector register VRc as in the lower row of Table 13.

TABLE 13

| Mnemonic | pgrad.[D] VRd, VRa, VRb, VR0 |
|---|---|
| | pgrad.[D] VRd, VRa, VRb |

Figure 18:
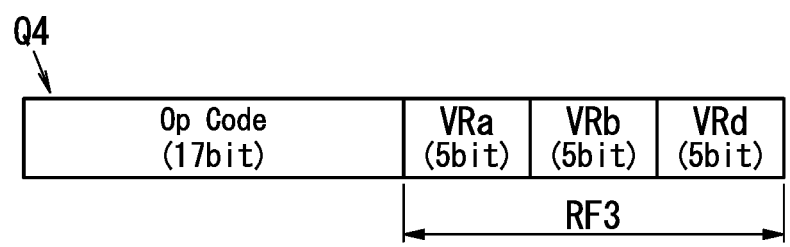
FIG. 18 is a schematic representation showing an exemplary instruction code according to an eighth variation.

Also, in that case, the instruction code Q3 describes only the register numbers a, b, d of the three vector registers VRa, VRb, VRd other than the register number (zero) of the third vector register VRc as shown in FIG. 18. Since the register number (zero) of the third vector register VRc is not described in the instruction code Q4 in that case, the register number specifying field RF3 will have a shorter bit length and the operation code will have a longer bit length accordingly.

(Ninth Variation)

Figure 19:
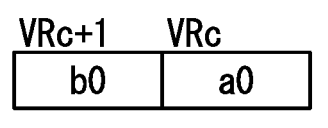

In the exemplary embodiment described above, the set including boundary value inverse number a0 and the gradient class b0 is stored in a vector register (i.e., the third vector register VRc). Alternatively, the set including the boundary value inverse number a0 and the gradient class b0 may also be stored in a general-purpose register. In that case, the processor 1 includes a general-purpose register Rc to store the boundary value inverse number a0 and another general-purpose register Rc+1 to store the gradient class b0 as shown in FIG. 19. In the example illustrated in FIG. 19, to shorten the general-purpose register number specifying field in an instruction code, the register numbers c, c+1 of the two general-purpose registers Rc, Rc+1 are serial numbers. In that case, the mnemonic of the vector instruction will be as shown in the following Table 14:

TABLE 14

| Mnemonic | pgrad.[D] VRd, VRa, VRb, Rc:Rc+1 |
|---|---|

(Other Variations)

In the exemplary embodiment described above, the multiplication processing S1, the comparison processing S2, and the replacement processing S3 are performed in accordance with a single vector instruction. Alternatively, only the multiplication processing S1 and the comparison processing S2, out of these three types of processing S1-S3, may be performed in accordance with a single vector instruction. In that case, the replacement processing S3 will be performed in accordance with another vector instruction.

Also, in the exemplary embodiment described above, the HOG feature quantity is generated with respect to a given image. Alternatively, the HOG feature quantity may also be generated with respect to physical information (such as a sound (e.g., a voice)) other than images.

Furthermore, in the exemplary embodiment described above, the gradient classes at a plurality of pixels of interest are calculated by parallel processing. Alternatively, the gradient classes may also be calculated one by one for the pixels of interest.

(Resume)

A processor (1) according to a first aspect of the present disclosure performs, in accordance with a single instruction, multiplication processing (S1) and comparison processing (S2). The multiplication processing (S1) includes obtaining a multiplication result (JT1-JT4) by multiplying together a first data element (VD11-VD14) and a first value (a0). The comparison processing (S2) includes comparing the multiplication result (JT1-JT4) with a second data element (VD21-VD24). The first data element (VD11-VD14) is stored in a first register (VRa), the second data element (VD21-VD24) is stored in a second register (VRb), and a first value (a0) is stored in a third register (VRc).

This configuration allows multiplication processing (S1) and comparison processing (S2) to be performed in accordance with a single instruction when an HOG feature quantity needs to be generated, thus enabling the HOG feature quantity to be generated more quickly.

In a processor (1) according to a second aspect of the present disclosure, which may be implemented in conjunction with the first aspect, the processor (1) is configured to further perform replacement processing (S3) in accordance with the single instruction. The replacement processing (S3) includes replacing, based on a comparison result (KT1-KT4) obtained by the comparison processing (S2), a third data element (VD31-VD34) with a second value (b0). The third data element (VD31-VD34) is stored in a fourth register (VRd). The second value (b0) is further stored in the third register (VRc).

This configuration allows multiplication processing (S1), comparison processing (S2), and replacement processing (S3) to be performed in accordance with a single instruction when an HOG feature quantity needs to be generated, thus enabling the HOG feature quantity to be generated more quickly.

In a processor (1) according to a third aspect of the present disclosure, which may be implemented in conjunction with the second aspect, multiple sets (such as a set (a0, b0) and a set (a1, b1)) are stored in the third register (VRc). Each of the multiple sets includes the first value (a0) and the second value (b0). The multiple sets are stored in mutually different storage areas in the third register (VRc). The single instruction includes a plurality of instruction mnemonics (such as pgradh.[D] and pgradl.[D]). Each of the plurality of instruction mnemonics causes the processor (1) to read the first value and the second value of an associated one of the multiple sets that are stored in the mutually storage areas.

This configuration allows the first value and the second value in any of at least two sets (such as a set (a0, b0) and a set (a1, b1)) that are stored in mutually different storage areas in the third register (VRc) to be read depending on which of the plurality of instruction mnemonics (such as pgradh. [D] and pgradl. [D]) is used. That is to say, this configuration allows the first values and the second values of the multiple sets stored in the mutually different storage areas to be read with the multiple sets not shifted in the third register (VRc).

In a processor (1) according to a fourth aspect of the present disclosure, which may be implemented in conjunction with the second or third aspect, a bit width of each of the first data element (VD11-VD14) and the second data element (VD21-VD24) is different from a bit width of the third data element (VD31-VD34).

According to this configuration, the bit width of the first data element (VD11-VD14) and the second data element (VD21-VD24) is not limited to the bit width of the third data element (VD31-VD34), thus increasing the degree of freedom in the bit width of the first data element (VD11-VD14) and the second data element (VD21-VD24).

A processor (1) according to a fifth aspect of the present disclosure, which may be implemented in conjunction with any one of the second to fourth aspects, includes the first register (VRa), the second register (VRb), the third register (VRc), and the fourth register (VRd). Register numbers are assigned as identification numbers to the first register (VRa), the second register (VRb), the third register (VRc), and the fourth register (VRd). The respective register numbers (such as c+1 and c) of at least one register (e.g., VRb) and another register (e.g., VRc) selected from the group consisting of the first register (VRa), the second register (VRb), the third register (VRc), and the fourth register (VRd) are serial numbers.

This configuration allows the register number (such as c+1) of a register (e.g., VRb), which is set at a number in series with another register number (such as c), to be omitted from a register number specifying field (RF2) of an instruction code (Q2, Q3). This allows the bit length of the register number specifying field (RF2) to be shortened in the instruction code (Q2, Q3), thus extending the bit length of an operation code accordingly. This enables the operation code to define a larger number of instructions.

A processor (1) according to a sixth aspect of the present disclosure, which may be implemented in conjunction with any one of the second to fifth aspects, includes the first register (VRa), the second register (VRb), the third register (VRc), and the fourth register (VRd). The register number (such as c) of at least one register (e.g., VRc) selected from the group consisting of the first register (VRa), the second register (VRb), the third register (VRc), and the fourth register (VRd) is fixed.

This configuration allows the fixed register number (such 0 (zero)) of a register (e.g., VRc) to be omitted from a register number specifying field (RF3) of an instruction code (Q4). This allows the bit length of the register number specifying field (RF3) to be shortened in the instruction code (Q4), thus extending the bit length of an operation code accordingly. This enables the operation code to define a larger number of instructions.

In a processor (1) according to a seventh aspect of the present disclosure, which may be implemented in conjunction with any one of the second to sixth aspects, a plurality of the first data elements (VD11-VD14) are stored in the first register (VRa). A plurality of the second data elements (VD21-VD24) are stored in the second register (VRb). A plurality of the third data elements (VD31-VD34) are stored in the fourth register (VRd). The multiplication processing (S1) includes obtaining a plurality of the multiplication results (JT1-JT4) by multiplying together the plurality of the first data elements (VD11-VD14) and the first value (a0). The plurality of the multiplication results (JT1-JT4) are associated with the plurality of the second data elements (VD21-VD24). The comparison processing (S2) includes obtaining a plurality of comparison results (KT1-KT4) by comparing the plurality of the second data elements (VD21-VD24) with associated ones (JT1-JT4) of the plurality of the multiplication results (JT1-JT4). The plurality of comparison results (KT1-KT4) are associated with the plurality of the third data elements (VD31-VD34). The replacement processing (S3) includes replacing the plurality of the third data elements (VD31-VD34) stored in the fourth register (VRd) with the second value (b0) based on associated ones (KT1-KT4) of the plurality of comparison results (KT1-KT4).

This configuration allows the plurality of first data elements (VD11-VD14), the plurality of second data elements (VD21-VD24), and the plurality of third data elements (VD31-VD34) to be processed in parallel with each other on the basis of their associated data elements. This enables the gradient classes of the plurality of first data elements (VD11-VD14) to be calculated simultaneously, thus enabling the HOG feature quantity to be generated more quickly.

In a processor (1) according to an eighth aspect of the present disclosure, which may be implemented in conjunction with the seventh aspect, multiple sets (such as a set (a0, b0) and a set (a1, b1)) are stored in the third register (VRc). Each of the multiple sets includes the first value and the second value. The multiple sets are arranged in line. The processor (1) is configured to read, in accordance with the single instruction, the first value (a0) and the second value (b0) of a set stored in a predetermined area (m33, m34) of the third register (VRc) as the first value for use in the multiplication processing (S1) and the second value for use in the replacement processing (S3). The processor (1) is configured to further perform, in accordance with the single instruction, shift processing including shifting, in one direction (Y1), the multiple sets stored in the third register (VRc) such that a set (e.g., a set (a1, b1)) stored in an area (m31, m32) adjacent to the predetermined area (m33, m34) moves to the predetermined area (m33, m34).

This configuration allows multiple sets (such as a set (a0, b0) and a set (a1, b1)) to be sequentially moved one by one to a predetermined area (m33, m34) of the third register (VRc) by storing the multiple sets in the third register (VRc) and shifting the multiple sets. This eliminates the need to permute the multiple sets, thus increasing the rate of the processing of generating the HOG feature quantity.

In a processor (1) according to a ninth aspect of the present disclosure, which may be implemented in conjunction with the eighth aspect, when the multiple sets are called a first plurality of sets and the one direction (Y1) is called a first shift direction (Y1), a second plurality of sets (such as a set (a2, b2) and a set (a3, b3)) are stored in a fifth register (VRc+1). Each of the second plurality of sets includes the first value and the second value. The second plurality of sets are arranged in line. The shift processing includes the processing of shifting, by one set, the second plurality of sets in a second shift direction (Y2) The shift processing also includes moving a second set (such as a set (a2, b2)) located at one end in the second shift direction (Y2), out of the second plurality of sets to a specified area (m31, m32) in the third register (VRc). The specified area (m31, m32) is adjacent to a first set (such as a set (a1, b1)), located at one end in a direction opposite from the first shift direction (Y1), out of the first plurality of sets.

This configuration allows, even when multiple sets (such as four sets from a set (a0, b0) through a set (a3, b3)) are separately stored in two registers (such as the third register (VRc) and the fifth register), the multiple sets to be processed as if the multiple sets were stored in a single register.

In a processor (1) according to a tenth aspect of the present disclosure, which may be implemented in conjunction with any one of the first to ninth aspects, the first data element (VD11-VD14) and the second data element (VD21-VD24) are mutually correlated data elements.

This configuration allows an HOG feature quantity when the first data element (VD11-VD14) and the second data element (VD21-VD24) are mutually correlated data elements to be generated.

In a processor (1) according to an eleventh aspect of the present disclosure, which may be implemented in conjunction with any one of the first to tenth aspects, the single instruction further causes the processor (1) to perform shift processing (S4). The shift processing (S4) includes shifting, by a predetermined number of bits, the second data element (VD21-VD24) stored in the second register (VRb).

This configuration allows the decimal point of the second data element (VD21-VD24) to be brought either into agreement with, or closer to, the decimal point of the multiplication result (JT1-JT4) obtained by the multiplication processing (S1). This increases the computational accuracy in the comparison processing (S2).

In a processor (1) according to a twelfth aspect of the present disclosure, which may be implemented in conjunction with any one of the first to eleventh aspects, the single instruction has a variable (Imm) replaceable with the predetermined number of bits to shift entered.

This configuration allows the predetermined number of bits to shift to be changed according to the value entered as the variable (Imm) The decimal point of the multiplication result (JT1-JT4) obtained by the multiplication processing (S1) varies according to the first value (a0-a7). Thus, changing the value entered as the variable (Imm) according to the first value (a0-a7) and thereby changing the predetermined number of bits to shift allows the computational accuracy to be increased in the comparison processing (S2) even when the first value (a0-a7) varies.

A processor (1) according to a thirteenth aspect of the present disclosure, which may be implemented in conjunction with any one of the first to twelfth aspects, includes a third register (VRc). The third register (VRc) is a general-purpose register.

This configuration allows the number of vector registers to use to be decreased because the third register (VRc) is a general-purpose register, thus allowing the processor to be further downsized.

A method for controlling a processor (1) according to a fourteenth aspect of the present disclosure includes making the processor (1) perform, in accordance with a single instruction, multiplication processing (S1) and comparison processing (S2). The multiplication processing (S1) includes obtaining a multiplication result (JT1-JT4) by multiplying together a first data element (VD11-VD14) and a first value (a0). The comparison processing (S2) includes comparing the multiplication result (JT1-JT4) with a second data element (VD21-VD24). The first data element (VD11-VD14) is stored in a first register (VRa), the second data element (VD21-VD24) is stored in the second register (VRb), and the first value (a0) is stored in a third register (VRc).

This configuration allows multiplication processing (S1) and comparison processing (S2) to be performed in accordance with a single instruction when an HOG feature quantity needs to be generated, thus enabling the HOG feature quantity to be generated more quickly.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A processor, comprising:
performing, in accordance with a single instruction, multiplication processing and comparison processing,
wherein the multiplication processing includes obtaining a multiplication result by multiplying together a first data element and a first value,
the comparison processing includes comparing the multiplication result with a second data element,
the first data element is stored in a first register,
the second data element is stored in a second register,
the first value is stored in a third register,
the processor is configured to further perform, in accordance with the single instruction, replacement processing, the replacement processing including replacing, based on a result of the comparison processing, a third data element with a second value,
the third data element is stored in a fourth register, and
the second value is further stored in the third register.

2. The processor of claim 1, wherein
multiple sets are stored in the third register,
each of the multiple sets includes the first value and the second value,
the multiple sets are stored in mutually different storage areas in the third register,
the single instruction includes a plurality of instruction mnemonics, and
each of the plurality of instruction mnemonics causes the processor to read the first value and the second value of an associated one of the multiple sets that are stored in the mutually different storage areas.

3. The processor of claim 1, wherein
a bit width of each of the first data element and the second data element is different from a bit width of the third data element.

4. The processor of claim 1, wherein
the processor includes the first register, the second register, the third register, and the fourth register,
register numbers are assigned as identification numbers to the first register, the second register, the third register, and the fourth register, and
the respective register numbers of at least one register and another register which are selected from a group consisting of the first register, the second register, the third register, and the fourth register are serial numbers.

5. The processor of claim 1, wherein
the processor includes the first register, the second register, the third register, and the fourth register,
a register number of at least one register selected from a group consisting of the first register, the second register, the third register, and the fourth register is fixed.

6. The processor of claim 1, wherein
a plurality of first data elements is stored in the first register,
a plurality of second data elements is stored in the second register,
a plurality of third data elements is stored in the fourth register,
the multiplication processing includes obtaining a plurality of multiplication results by multiplying the plurality of the first data elements and the first value together, the plurality of the multiplication results being associated with the plurality of the second data elements,
the comparison processing includes obtaining a plurality of comparison results by comparing the plurality of the second data elements with associated ones of the plurality of the multiplication results, the plurality of comparison results being associated with the plurality of the third data elements, and
the replacement processing includes replacing the plurality of the third data elements stored in the fourth register with the second value based on associated ones of the plurality of comparison results.

7. The processor of claim 6, wherein
multiple sets are stored in the third register,
each of the multiple sets includes the first value and the second value,
the multiple sets are arranged in line,
the processor is configured to read, in accordance with the single instruction, the first value and the second value of a set stored in a predetermined area of the third register as the first value for use in the multiplication processing and the second value for use in the replacement processing, respectively, and
the processor is configured to further perform, in accordance with the single instruction, shift processing including shifting, in one direction, the multiple sets stored in the third register such that a set stored in an area adjacent to the predetermined area moves to the predetermined area.

8. The processor of claim 7, wherein
when the multiple sets are called a first plurality of sets, and
the one direction is called a first shift direction,
a second plurality of sets are stored in a fifth register,
each of the second plurality of sets includes the first value and the second value,
the second plurality of sets is arranged in line, and
the shift processing includes the shifting, by one set, the second plurality of sets in a second shift direction and moving a second set, located at one end in the second shift direction, out of the second plurality of sets to a specified area in the third register, the specified area being adjacent to a first set, located at one end in a direction opposite from the first shift direction, out of the first plurality of sets.

9. The processor of claim 1, wherein
the first data element and the second data element are mutually correlated data elements.

10. The processor of claim 1, wherein
the single instruction further causes the processor to perform shift processing including shifting, by a predetermined number of bits, the second data element stored in the second register.

11. The processor of claim 10, wherein
the single instruction has a variable replaceable with the predetermined number of bits by which the shift processing shifts the second data element.

12. The processor of claim 1, comprising the third register, wherein
the third register is a general-purpose register.

13. The processor of claim 3, wherein
the third data element is stored in a storage area that forms a least significant half of the fourth register.

14. The processor of claim 3, wherein
the third data element is stored in a storage area that forms a most significant half of the fourth register.

15. The processor of claim 3, wherein
the bit width of each of the first data element and the second data element is less than the bit width of the third data element.

16. The processor of claim 7, wherein
all of the multiple sets, each including the first value and the second value, are stored in the third register.

17. The processor of claim 1, wherein
an instruction code of the single instruction describes an operation code that defines an instruction and a register number that specifies a register, and
a register number of at least one of the first register, the second register, the third register, or the fourth register is in series with a register number of another one of the first, second, third, or fourth register.

18. The processor of claim 1, wherein
an instruction code of the single instruction describes an operation code that defines an instruction and a register number that specifies a register, and
a register number of at least one of the first register, the second register, the third register, or the fourth register is fixed.

19. A method for controlling a processor, the method comprising:
performing, in accordance with a single instruction, multiplication processing and comparison processing,
wherein the multiplication processing includes obtaining a multiplication result by multiplying together a first data element and a first value,
the comparison processing includes comparing the multiplication result with a second data element,
the first data element is stored in a first register,
the second data element is stored in a second register,
the first value is stored in a third register,
the method further comprises:
performing, in accordance with the single instruction, replacement processing, the replacement processing including replacing, based on a result of the comparison processing, a third data element with a second value,
the third data element is stored in a fourth register, and
the second value is further stored in the third register.

* * * * *